United States Patent
Murphy et al.

(10) Patent No.: US 7,249,448 B2
(45) Date of Patent: Jul. 31, 2007

(54) STABILIZED AGRICULTURAL APPARATUS

(76) Inventors: Richard Murphy, Robinstown House, via Waterford, Glenmore (IE); David Murphy, Robinstown House, via Waterford, Glenmore (IE)

( * ) Notice: Subject to any disclaimer, the term of this patent is extended or adjusted under 35 U.S.C. 154(b) by 177 days.

(21) Appl. No.: 10/483,589

(22) PCT Filed: Jul. 5, 2002

(86) PCT No.: PCT/IE02/00097

§ 371 (c)(1),
(2), (4) Date: Jun. 10, 2004

(87) PCT Pub. No.: WO03/005799

PCT Pub. Date: Jan. 23, 2003

(65) Prior Publication Data

US 2004/0231308 A1 Nov. 25, 2004

(30) Foreign Application Priority Data

Jul. 9, 2001 (IE) .............................. S2001/0637

(51) Int. Cl.
*A01D 34/00* (2006.01)
(52) U.S. Cl. ..................................................... 56/15.8
(58) Field of Classification Search ................. 56/14.9, 56/14.7, 15.3, 15.5, 15.7, 15.9, 16.8, 15.8; 239/167
See application file for complete search history.

(56) References Cited

U.S. PATENT DOCUMENTS

| | | | | |
|---|---|---|---|---|
| 2,647,795 A | * | 8/1953 | Kucera | ........................ 239/167 |
| 4,067,178 A | | 1/1978 | Miller | |
| 4,476,666 A | * | 10/1984 | van der Lely et al. | ........ 56/13.6 |
| 5,136,782 A | * | 8/1992 | Calcinai | ........................ 30/276 |
| 5,291,723 A | | 3/1994 | Lindley | |

FOREIGN PATENT DOCUMENTS

| | | |
|---|---|---|
| FR | 2270774 | 12/1975 |
| FR | 2630301 | 10/1989 |
| FR | 2654574 | 5/1991 |
| GB | 2071475 | 9/1981 |
| GB | 2088181 | 6/1982 |
| GB | 2222755 | 3/1990 |

* cited by examiner

*Primary Examiner*—Thomas B. Will
*Assistant Examiner*—Alicia Torres
(74) *Attorney, Agent, or Firm*—Klehr Harrison Harvey Branzburg & Ellers LLP

(57) ABSTRACT

An agricultural apparatus is disclosed. The apparatus is adapted to be mounted to an agricultural machine such as a tractor and is provided with a boom having two arms extending in a direction substantially transverse to the agricultural machine. The boom arm are provided with a plurality of heads, adapted for either cutting or spraying, and can be used to cut or spray discrete areas of vegetation over which the apparatus passes. The apparatus is adapted to maintain the arms in a direction substantially parallel to the vegetation over which it is passing irrespective of the terrain.

33 Claims, 19 Drawing Sheets

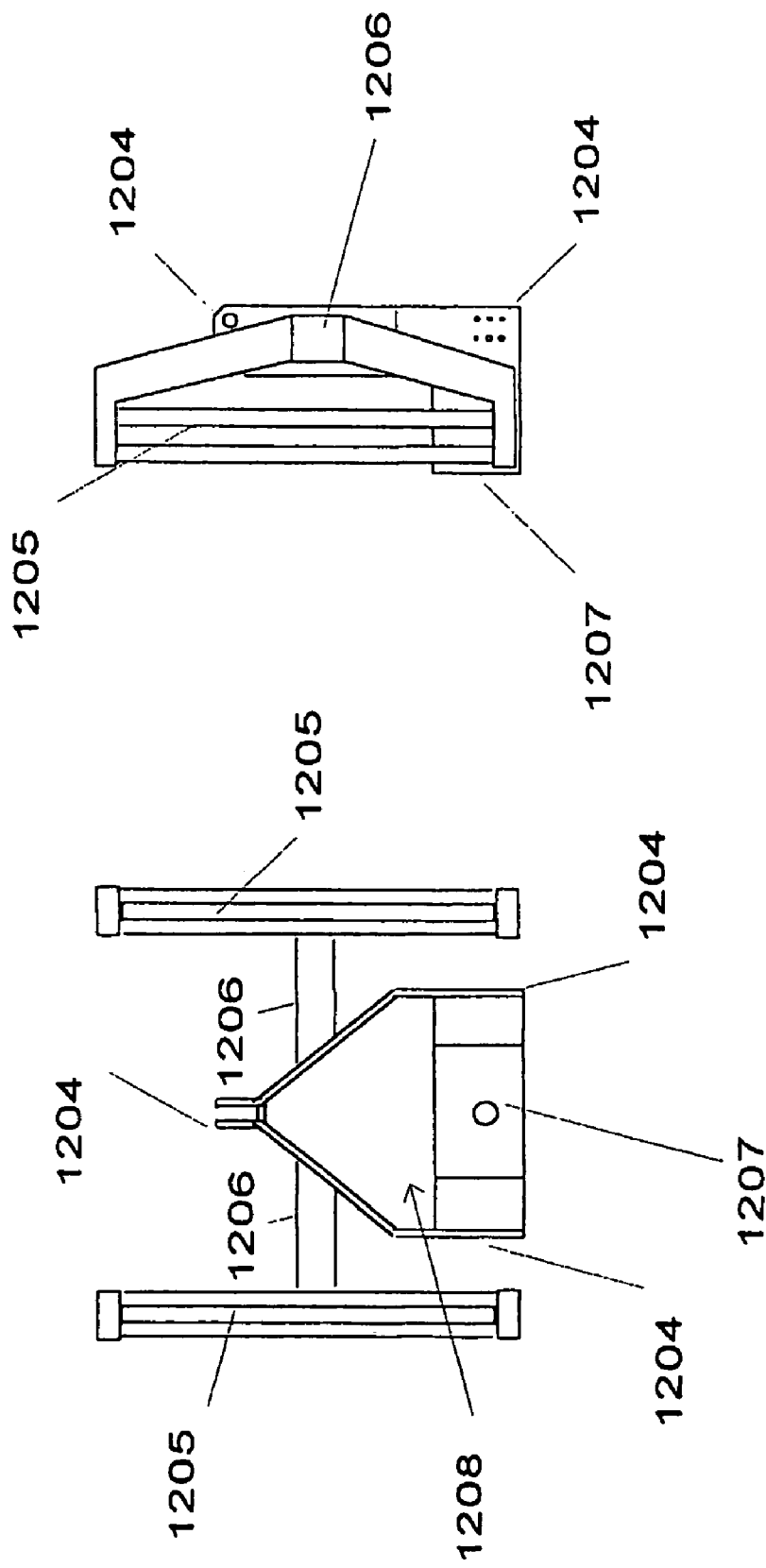

STABILIZED AGRICULTURAL APPARATUS

FIELD OF THE INVENTION

The invention relates to agricultural apparatus adapted for use in combination with an agricultural machine such as a tractor or the like. The invention particularly relates to cutting machines provided with a plurality of cutting elements and adapted for topping plants. By the term "topping" is meant the cutting to a desired height of a particular plant. The invention additionally provides a spraying machine having a plurality of spraying heads and adapted for spraying plants with pesticides and the like.

BACKGROUND TO THE INVENTION

The use of agricultural machinery is well known as an efficient manner to effectively manage large areas of vegetation. The type of machine varies with the specific application but it is well known to utilise individual machines for the cutting of vegetation and spraying. These machines are connectable to an agricultural vehicle such as a tractor and are operable, typically from within the cab. When providing a machine with a plurality of heads, either for spraying or cutting, it is necessary to ensure that these are provided in a stable operating condition such that the vehicle can traverse different terrain conditions without altering the performance of the cutting or spraying.

Agricultural cutting machines are well known for varying applications. The cutting machines are typically mounted to the front of the tractor, and controlled from within the cab of the tractor by the driver. Depending on the application the cutting machine may comprise one or a plurality of cutting elements.

Another known cutting machine is described in U.S. Pat. No. 3,683,603 and discloses a plant topping device which is connectable to a tractor. This plant topping device includes at least one rotary cutting device which is mounted upon a frame which extends transversely to the movement of the tractor to which the device is mounted. The frame is moved over the tops of the plants and the action of the rotary blade cuts the tops off the plants. The device is fully height adjustable. By using multiple cutting heads it is possible to cut a plurality of plants at the same time. This device is described for use in tobacco farming wherein a plurality of plants are provided in parallel rows. By using a device such as that described in U.S. Pat. No. 3,683,603 it is possible to top multiple plants in adjacent rows at the same time. While being advantageous in that multiple plants may be cut simultaneously, the device of U.S. Pat. No. 3,683,603 suffers in that the frame portion extends to only one side of the tractor, thereby reducing the cutting coverage, and due to the rigid mounting arrangement of the frame to the tractor is not suitable for mounting multiple heads to the frame. The addition of more cutting heads to this device in an attempt to overcome these shortcomings, is not possible as the mounting arrangement is not sufficiently stable to support the additional length of the frame required to support more cutting heads.

U.S. Pat. No. 5,960,614 discloses a mower boom with a dampening mechanism. This is provided in the form of a torsion hitch which enables a cushioning of movement of a mower attachable to a tractor. This cutting arrangement does not extend any great distance beyond the width of the tractor, and therefore the area of cutting that can be effected in any one sweep is quite small.

U.S. Pat. No. 5,210,997 describes a side mounted cutting arrangement which is extendible to one side of the agricultural vehicle to which the cutting arrangement is mounted. The arrangement includes an articulated boom with a cutting head mounted to the end thereof. The boom is pivotable through an arc in excess of 180°, and does enable the cutting of vegetation some distance from the agricultural vehicle, but due to the provision of only one cutting head is limited to a specific area application.

There, therefore, exists a need to provide an improved cutting device for cutting a multiplicity of plants in adjacent rows. There also exists a need to provide an improved spraying head arrangement for enabling the spraying of a large area of vegetation utilising a stable spraying device.

OBJECT OF THE INVENTION

It is an object of the present invention to provide a an agricultural apparatus provided with a plurality of cutting elements or spray heads.

SUMMARY OF THE INVENTION

Accordingly the present invention provides an agricultural apparatus adapted to be mounted to an agricultural vehicle, the apparatus comprising:
 a mounting frame mountable on the agricultural vehicle,
 a height adjustable boom pivotably mountable on the mounting frame and provided with a series of cutting elements for cutting discrete areas of vegetation over which the boom is passed, the height of the boom relative to the mounting frame being adjustable so as to allow the height at which the vegetation is cut to be adjusted, the boom being pivotable to enable the boom to move in a direction transverse to the intended direction of travel, and
 a damper provided between the boom and the frame to dampen movement of the boom relative to the frame.

In an alternative embodiment the apparatus is modified for use as a spraying apparatus.

The boom is preferably moveable between at least two positions, a first operative position wherein the boom is substantially transverse to the vehicle and a second non-operative position wherein the boom is substantially aligned with the longitudinal axis of the vehicle.

The mounting frame desirably comprises an outer frame comprising two parallel vertically disposed support struts connected by a horizontal connect member and a central strut provided between the support struts and suspended from the connect member. The suspension of the connect member is preferably effected by co-operation of the central strut to a biasing means provided on the connect member, the biasing means enabling a movement of the central strut in response to the forces applied to the frame so as to form a damper.

The forces applied to the frame typically arise from a motion of the agricultural vehicle over uneven terrain.

The boom is desirably provided with a sleeve member adapted to co-operate with the central strut of the mounting frame, the co-operation of the sleeve member with the central strut enabling a movement of the support frame along a longitudinal axis of the central strut.

The movement is desirably effected by the provision of a piston arrangement attachable to both the central strut and to the sleeve member, the actuation of the piston arrangement effecting a relative movement of the strut and the sleeve, which when a desired relative position is achieved can be maintained by a locking of the piston.

The boom additionally comprises a support member pivotably attachable to the sleeve member, and additionally pivotably connectable at either end thereof to swinging support arms, the swinging support arms being pivotably connectable at their other end to a boom connection frame, the pivoting arrangement of the support arms relative to both the support member and the connection frame enabling a movement of the connection frame relative to the sleeve member.

A second piston arrangement is suitably provided so as to enable a movement of the support member relative to the sleeve member, the movement effecting a change in level of the boom connected thereto. The second piston arrangement is suitably mountable to both the sleeve member and the support member, the actuation of the piston effecting a pivoting of the support member relative to the sleeve member, thereby changing the angular disposition of the connection frame.

In this way it will be appreciated that the invention provides a mounting frame which is rigidly attachable to an agriculture vehicle, the mounting frame being pivotably attachable to an arcuating boom, the arcuating boom having a plurality of cutting devices mounted thereon Each boom is preferably provided with a plurality of engagement means adapted to engage with individual cutting devices.

The cutting devices desirably comprise a shaft unit adapted to co-operate with the engagement means provided on the boom, the shaft unit comprising a collar with a rotatable shaft mounted therein. The collar is desirably co-operable with the boom and the rotatable shaft is free to rotate within the collar. The rotatable shaft is desirably provided with cutting elements at one end thereof, the cutting elements being remote from the boom.

Guard means may additionally be provided, the guard means being provided between the boom and the cutting elements, the guard means adapted to prevent any vegetation coming into contact with the shaft.

The length of the cutting elements is preferably adjustable.

Desirably, adjacent cutting devices are provided with cutting elements of non-equal length.

The rotation of the cutting elements is desirably effected by means of a belt mechanism, the belt mechanism being desirably powered by a motor mountable to the boom. In a preferred embodiment the same belt is used for effecting rotation of all cutting elements.

In accordance with another embodiment an agricultural apparatus is provided having an extendible boom adapted, which when mounted on an agricultural vehicle, is adapted to extend on both sides of the vehicle, the boom having a plurality of heads that can cut or spray discreet areas of vegetation over a crop canopy through which the agricultural vehicle passes. The apparatus is adapted such that the settings for height and angle adjustment of the boom are maintained over bumpy ground and on side hills by a dampening system which consists of free hanging pendulum that carries the boom, the pendulum being suspended from a vertical strut that is pivotally carried on the mounting frame and moves against the transverse movement of the agricultural over uneven ground thus always keeping the pendulum and the vertical strut parallel.

The boom desirably comprises two arms, each arm being moveable between at least two positions, a first operative position wherein the boom is substantially transverse to the vehicle and a second non-operative position wherein the boom arms are substantially parallel.

Preferably each arm of the boom is provided in a plurality of engageable sections, at least one of the sections being foldable onto another, and wherein in an extended position the multiple sections are supported by interleaving support members extending along the axis of the arm.

The damper of this embodiment desirably comprises a vertical strut pivotably mounted to the mounting frame and pivotable relative to a pendulum which is further pivotable relative to the boom, the pendulum being mounted so as to desirably maintain an orientation substantially perpendicular to the vegetation over which the apparatus passes and wherein the vertical strut acts so as to desirably maintain an orientation parallel to the pendulum.

The boom preferably additionally comprises a support member pivotably attachable to the pendulum, and additionally pivotably connectable at either end thereof to swinging support arms, the swinging support arms being pivotably connectable at their other end to a boom connection frame, the pivoting arrangement of the support arms relative to both the support member and the connection frame enabling a movement of the connection frame relative to the vertical strut.

Such pivotable mounting of the boom relative to the pendulum is desirably provided by a carrier arm engageable with both the pendulum and the arms of the boom, a pivoting of the carrier arm relative to the pendulum enabling a change in orientation of the arms relative to the pendulum.

The carrier arm may include an actuating means, such as a hydraulic ram, disposed between the carrier arm and the pendulum, actuation of which effects a movement of the carrier arm relative to the pendulum.

The mounting frame typically includes engagement members adapted to engage with restraining members provided on the boom, the interaction between the engagement members and the restraining members maintaining the boom in an orientation transverse to the intended direction of travel. Such maintenance allows maintaining a free movement of the boom regardless of gradient over which the agricultural vehicle travels.

When provided, the engagement members are typically mountable on arms extending from either side of the mounting frame, the arms being pivotably mountable relative to the mounting frame and adapted to move relative to the mounting frame to compensate for any corresponding movement of the boom.

Each of the arms are desirably pivotably mountable to a moveable connect member provided on the mounting frame, the connect member thereby connecting both sides of the boom through the mounting frame such that movement on one side of the boom can result in movement of the other side of the boom.

The apparatus may be adapted to include sensing means, the sensing means adapted to sense any movement of the pendulum relative to the vertical strut and to effect a movement of the vertical strut relative to the mounting frame to compensate for such movement.

The pendulum is typically, in this embodiment, mountable on an arched roller arrangement provided between the vertical strut and the pendulum. Such an arched roller arrangement may comprise a roller mechanism having at least two rollers which are adapted to be moveable along a curved support bar, the pendulum being suspendable from the roller mechanism. The roller arrangement may further include biasing means adapted to maintain the roller mechanism in a central orientation relative to the curved support bar.

In a preferred embodiment the vertical pendulum is telescopic, the telescoping pendulum having a hydraulic ram fitted thereto, an actuation of the ram effecting a change in length of the pendulum.

The provision of such a ram can be adapted to effect a cushioning extension or contraction of the pendulum so as to enable it to provide a dampening effect.

These and other features of the present invention will be better understood with reference to the following drawings

BRIEF DESCRIPTION OF THE DRAWINGS

FIG. 12a is a front view of the mounting frame portion of the apparatus,

FIG. 12b is a side view of the mounting frame of FIG. 12a,

DETAILED DESCRIPTION OF THE DRAWINGS

Figure 1:
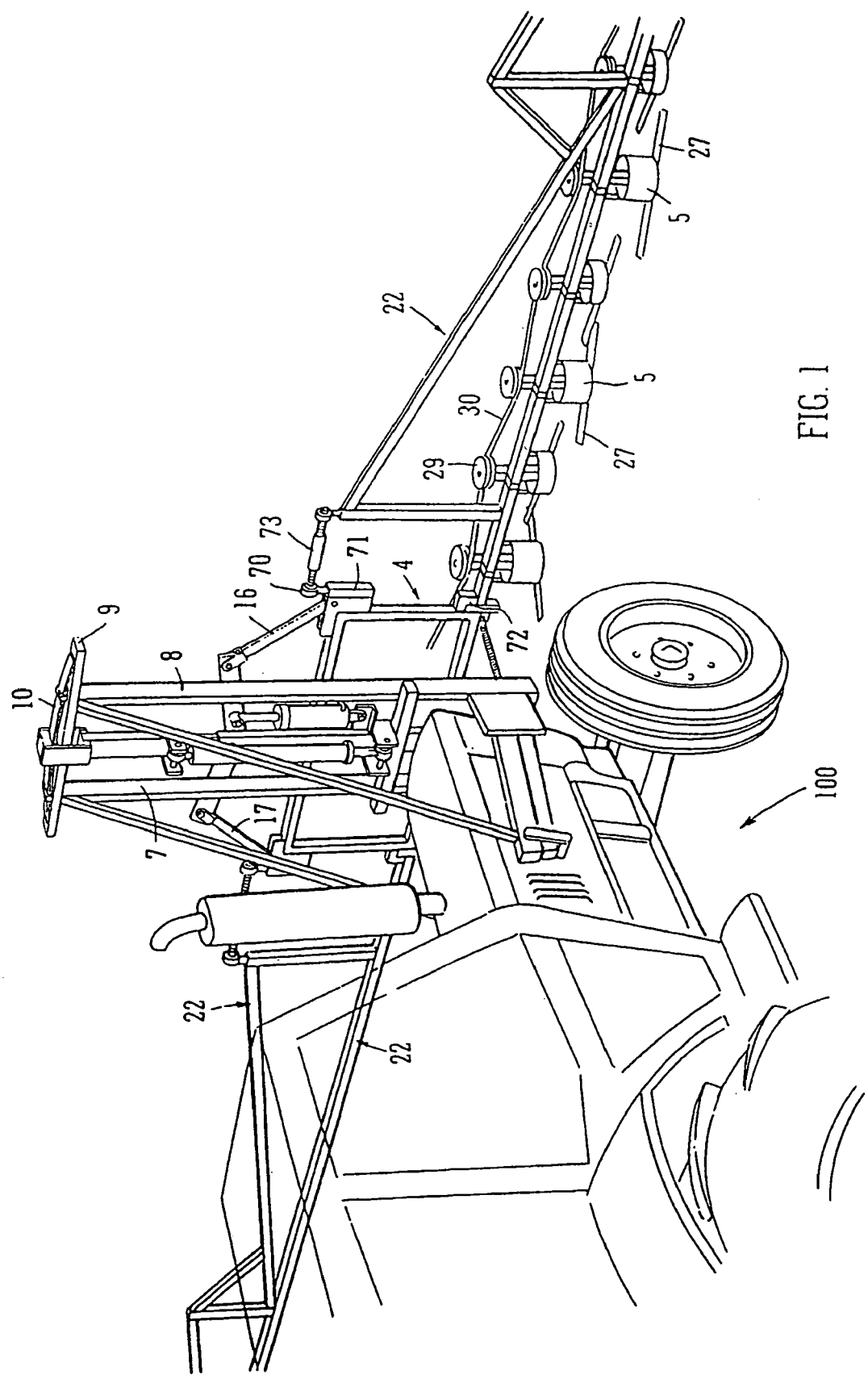
FIG. 1 shows a cutting apparatus according to the present invention mounted on a tractor and in the operable position.

FIGS. 1 to 6 show a cutting apparatus 1 according to a first embodiment of the present invention. In a preferred embodiment the apparatus 1 is adapted to be mounted on the front of an agricultural vehicle, such as a tractor 100. The apparatus comprises a mounting frame 3, having a boom 4 connected thereon, the boom having a plurality of cutting devices 5 which when the boom is in the operable position, shown in FIG. 1, extend substantially transverse to the longitudinal axis of the tractor. As the cutting devices 5 are disposed on both sides of the tractor, it is possible for the farmer or other user to drive the tractor in a field and cut vegetation on both sides of the tractor. The view shown in FIG. 1 details the provision of cutting elements on one arm of the boom only, and it will be appreciated that this is for simplicity of understanding, and that cutting devices are provided on both sides of the boom.

Figure 2:
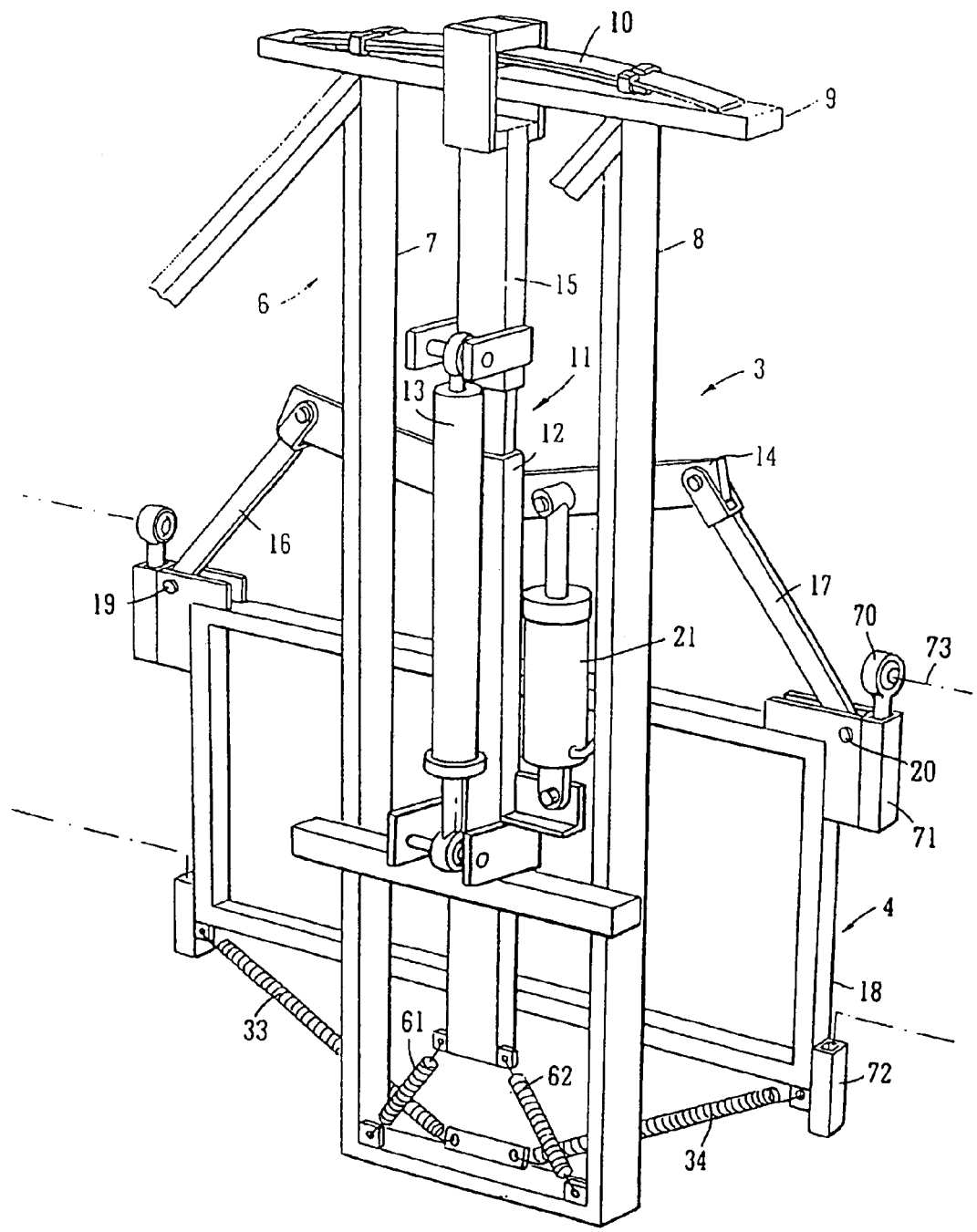
FIG. 2 is a perspective view of a portion of the mounting frame and boom of the present invention.
Figure 3:
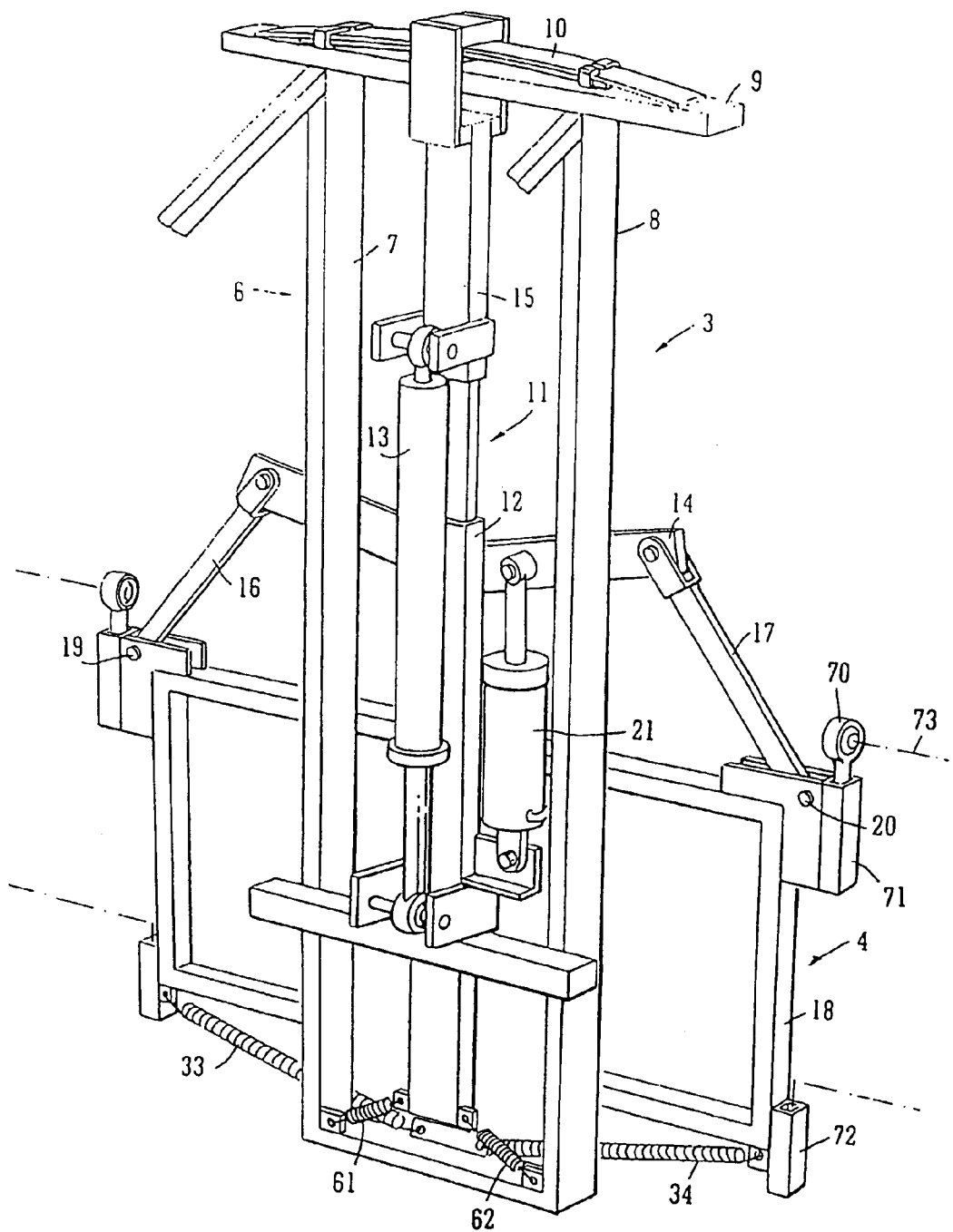
FIG. 3 is a view of the device shown in FIG. 2 in an alternate position.
Figure 4:
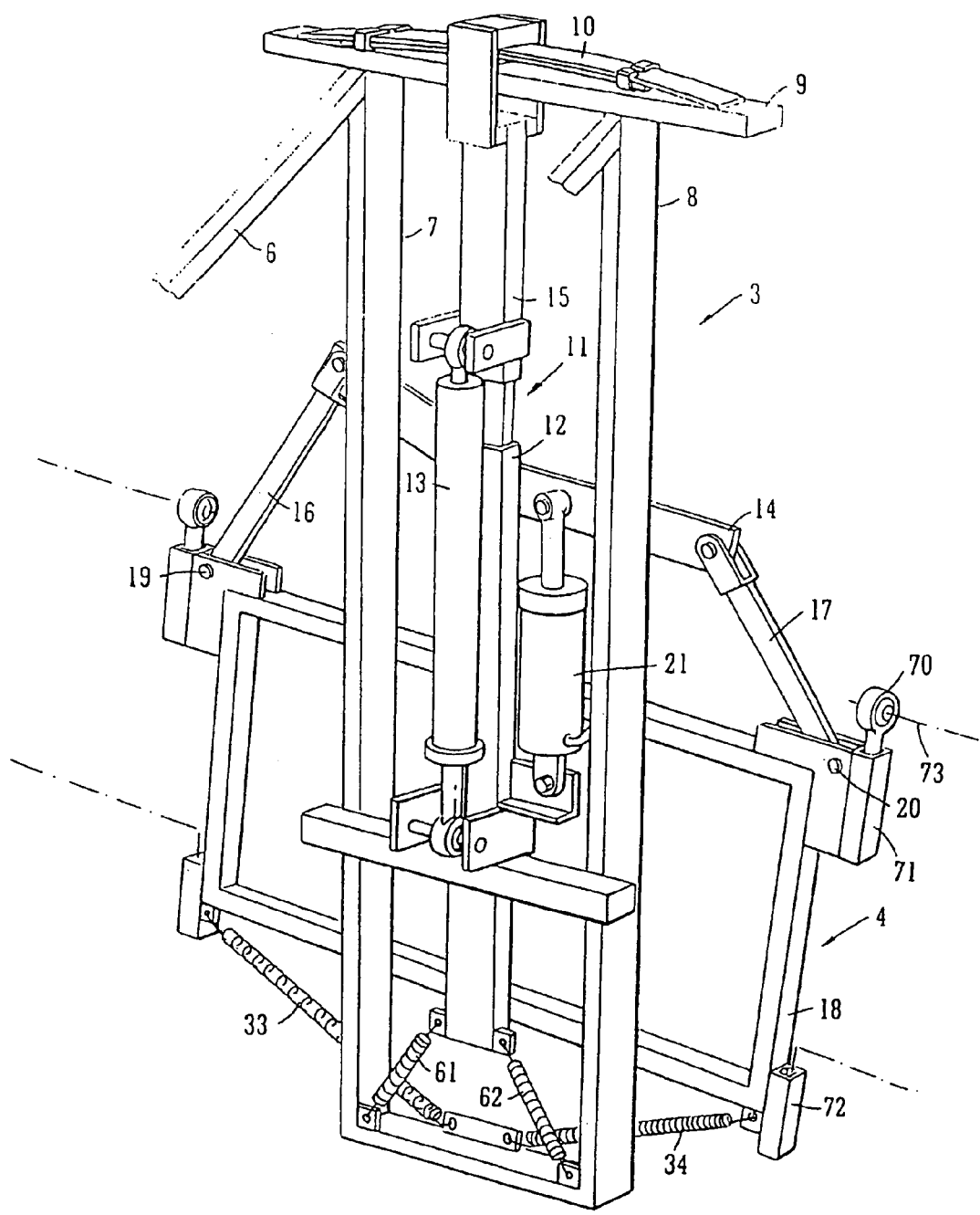
FIG. 4 is a view of the device of FIG. 3 in yet another alternative position.

As shown in FIGS. 2 to 4, the mounting frame 3, which is mountable on the agricultural vehicle, is connectable to the height adjustable boom 4 which is pivotably mountable on the mounting frame. The height of the boom relative to the mounting frame is adjustable so as to allow the height at which the vegetation is cut to be adjusted, and the boom is pivotable to enable the boom to move in a direction transverse to the intended direction of travel of the tractor. Such a transverse movement minimises the movement of the boom in an upwardly and downwardly direction when the tractor is passing over uneven terrain, but when encountering serious bumps in the ground can allow the boom to move across thereby keeping the side that the boom is going towards to be slightly raised and the other side of the boom to be lowered.

In the embodiment of the present invention illustrated in FIG. 2 to 4, the mounting frame 3 comprises a rectangular frame 6 having two vertical support members 7, 8 with a horizontal bar 9 linking the two across the top of the frame. The frame is attachable to the front of the tractor with a quick release mechanism such as that known for front loader type devices.

A leaf spring 10 is provided on the horizontal bar 9 and a central strut or pendulum 11 is suspended therefrom. This spring is adapted to absorb impacts while travelling on bumpy ground, thereby acting as a damper.

The pendulum 11 hangs from the horizontal bar 9, by means of a connection member 15, and is slidably connected to the boom by means of a sleeve member 12 moveable on the central strut. The movement of the sleeve member 12 relative to the strut 11 is controlled by means of a hydraulic ram or piston 13 attachable to both the connection member portion 15 of the strut 11 and the sleeve member 12. Actuation of the piston can move the sleeve member either up or down the strut 11, and once the desired position is achieved the piston is locked, such that the sleeve and strut effective form a single rigid member. The movement of the pendulum in a direction away from the vertical is dampened by the provision of springs 61, 62 which are attached to a lower portion of the pendulum 11 and the mounting frame 3.

The sleeve member 12 is pivotably connected to a support arm 14 of the boom at an upper portion thereof. Desirably, the support arm 14 is a V-shaped member pivotably attached to the sleeve member at the lower central portion of the V. Two swinging support arms 16, 17 are pivotably attached at each end of the support arm and are adapted to carry a support frame 18, through two pivot connections 19, 20. The support frame 18 is thereby free to move in a direction transverse to the hanging central strut. The movement of the support frame is dampened by the provision of two springs 33, 34 linking the support frame 18 to the mounting frame.

The V-shaped support arm 14 is desirably also connectable to a ram 21 which is connected at the other end thereof to the slide member. Actuation of the ram 21 can therefore alter the angular orientation of the arm 14 relative to the slide member. This can be used to change the orientation of the boom in circumstances where it is being used in non-level terrain, such as in a field on the side of a hill.

The support frame 18 is hingably attached to two arms 22, 23 of the boom, each arm carrying a plurality of cutting elements. This hinge attachment enables a movement of the arms from an operable position, as shown in FIG. 1, wherein the arms extend transversely to the direction of travel of the tractor, to a non-operable position wherein the arms can be retracted alongside the tractor, not shown, so as allow for ease of transport between locations where cutting is required. The pivoting arrangement of the arms 22, 23 is enabled by a ball socket arrangement 70 provided on the mounting frame 3 and which is linkable to an upper portion of the arms 22, 23 via a threadable locking arm 73. The frame 3 is attachable directly to a lower portion of the arms 22, 23 by an inter-engagement of the arm 22, 23 with a socket 72 provided on the frame 3. To move the arm rearwardly so as to align with the tractor it is necessary to rotate the arm about the pivot points 71, 72. It will be appreciated by those skilled in the art that alternative methods of providing this movement may be evident to those skilled in the art.

Figure 6:
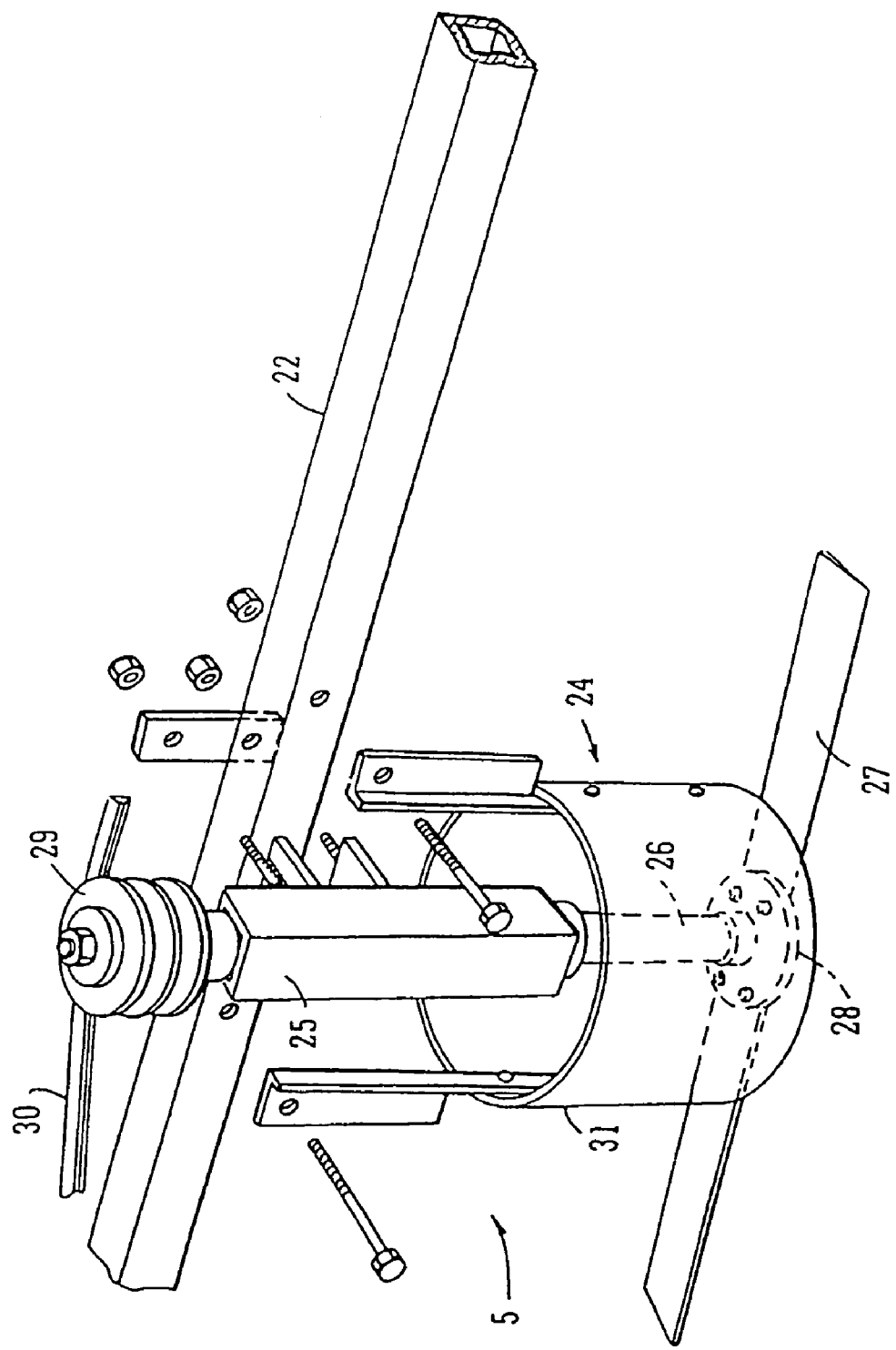
FIG. 6 is an exploded view of a cutting device of the present invention.

Each arm is provided with a series of engagement locations for locating individual cutting devices. As shown in FIG. 6, individual cutting devices 5 desirably comprise a shaft unit 24 adapted to co-operate with the engagement means provided on the boom arm. The shaft unit 24 comprises a collar 25 with a rotatable shaft 26 mounted therein. The collar 24 is desirably co-operable with the boom and the rotatable shaft is free to rotate within the collar. The rotatable shaft is desirably provided with cutting elements 27 at one end thereof, the cutting elements being remote from the boom arm. The cutting elements or blades 27 are mountable within a blade holder 28 which is adapted to enable easy removal of the individual blades from the holder, yet which when mounted therein are not prone to accidental removal. The blade holder 28 is clamped to the end of the shaft 26. At the other end of the shaft 26, a belt head 29 is provided, the belt head adapted to co-operate with a belt 30 which is powered by a hydraulic motor locatable in the central portion of the boom. The rotation of the belt 30 effects a corresponding rotation of the belt head 29, and the cutting elements 27 connected thereto. It will be appreciated from an inspection of the drawings that the entire operable mechanism of the belt operation has been shown in simplified form.

Figure 5:
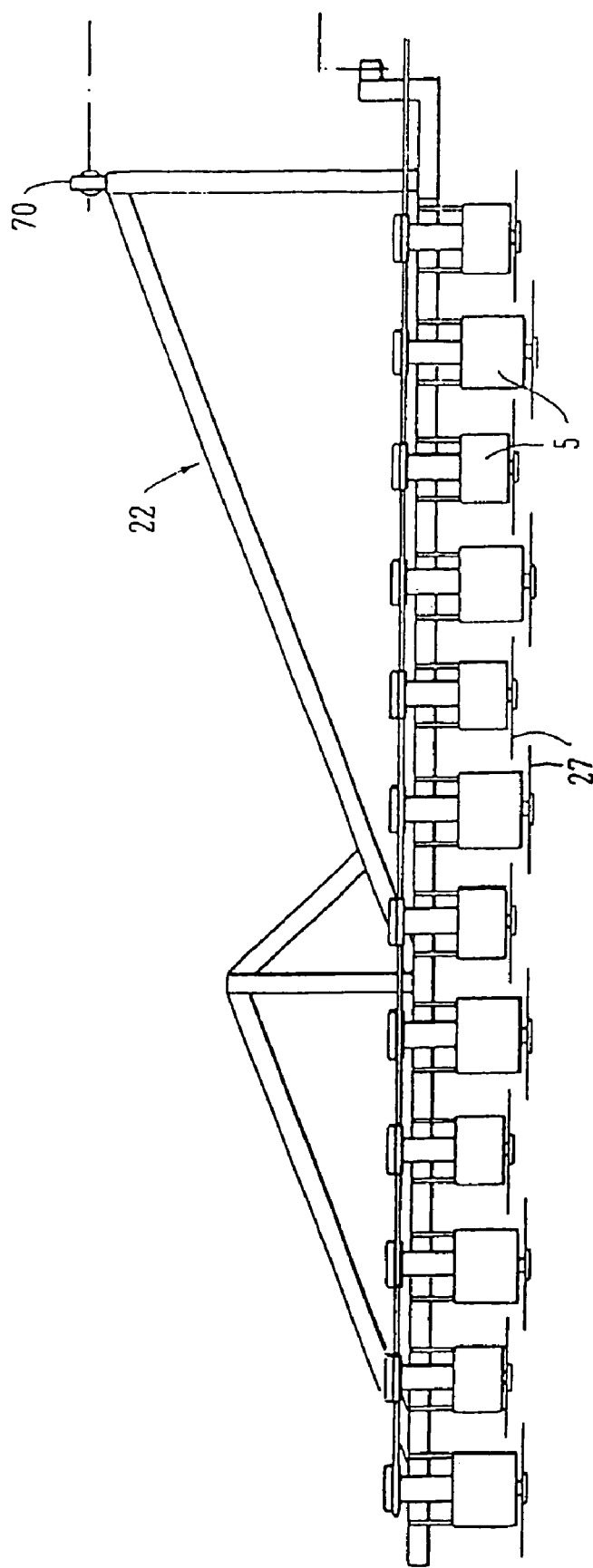
FIG. 5 is a perspective view of the boom showing the positioning of cutting devices thereon.

Desirably, adjacent cutting devices 5 are provided with non-equal length cutting elements so as to ensure that the individual cutting elements do not come into contact with each other, thereby leading to an accident. To ensure that an equal coverage of cutting of the vegetation is achieved the height of the cutting devices is staggered, as shown in FIG. 5.

Guard means 31 may additionally be provided on the boom arms. The guard means 31 are provided between the arm and the cutting elements 27, the guard means adapted to prevent any vegetation coming into contact with the shaft. It also ensures that any weeds encountered during operation of the apparatus are directed towards the cutting elements.

When the device of the present invention is being used the boom arms are extended to their full length transverse to the intended direction of travel of the tractor. The height of the boom relative to the mounting frame is adjusted for the vegetation in question, and the angular displacement of the two arms is also adjusted to compensate for a non level field. Once this has been chosen, the hydraulic motor is turned on which effects a rotation of the belt and thereby effects a turning of the cutting elements. The tractor is then moved about the field topping the vegetation located in adjacent rows. This application is particularly suitable for the control of wild oats in grain fields.

Figure 7:
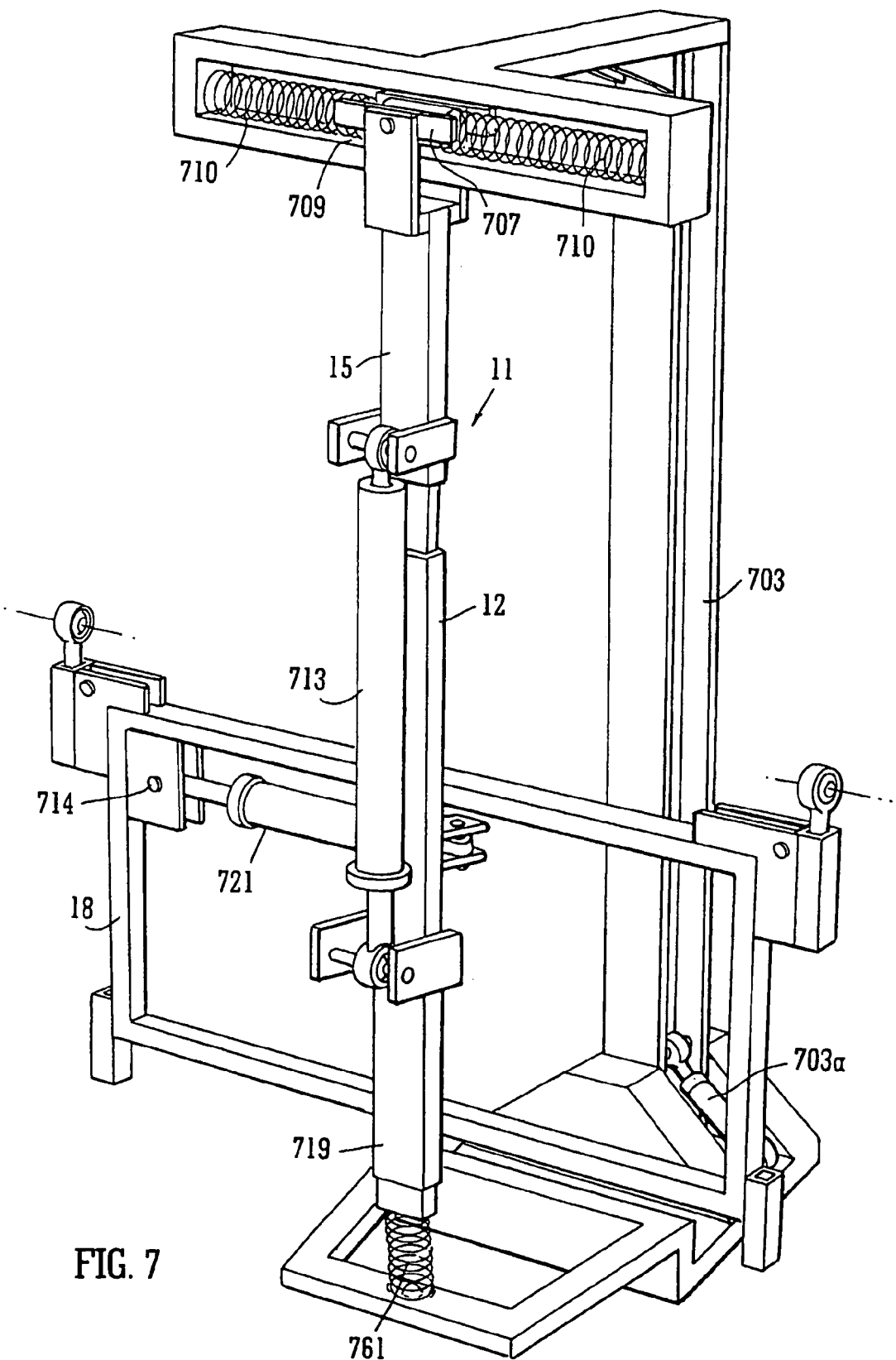
FIG. 7 is an alternative embodiment of the apparatus of the present invention corresponding to the view of FIG. 2.
Figure 8:
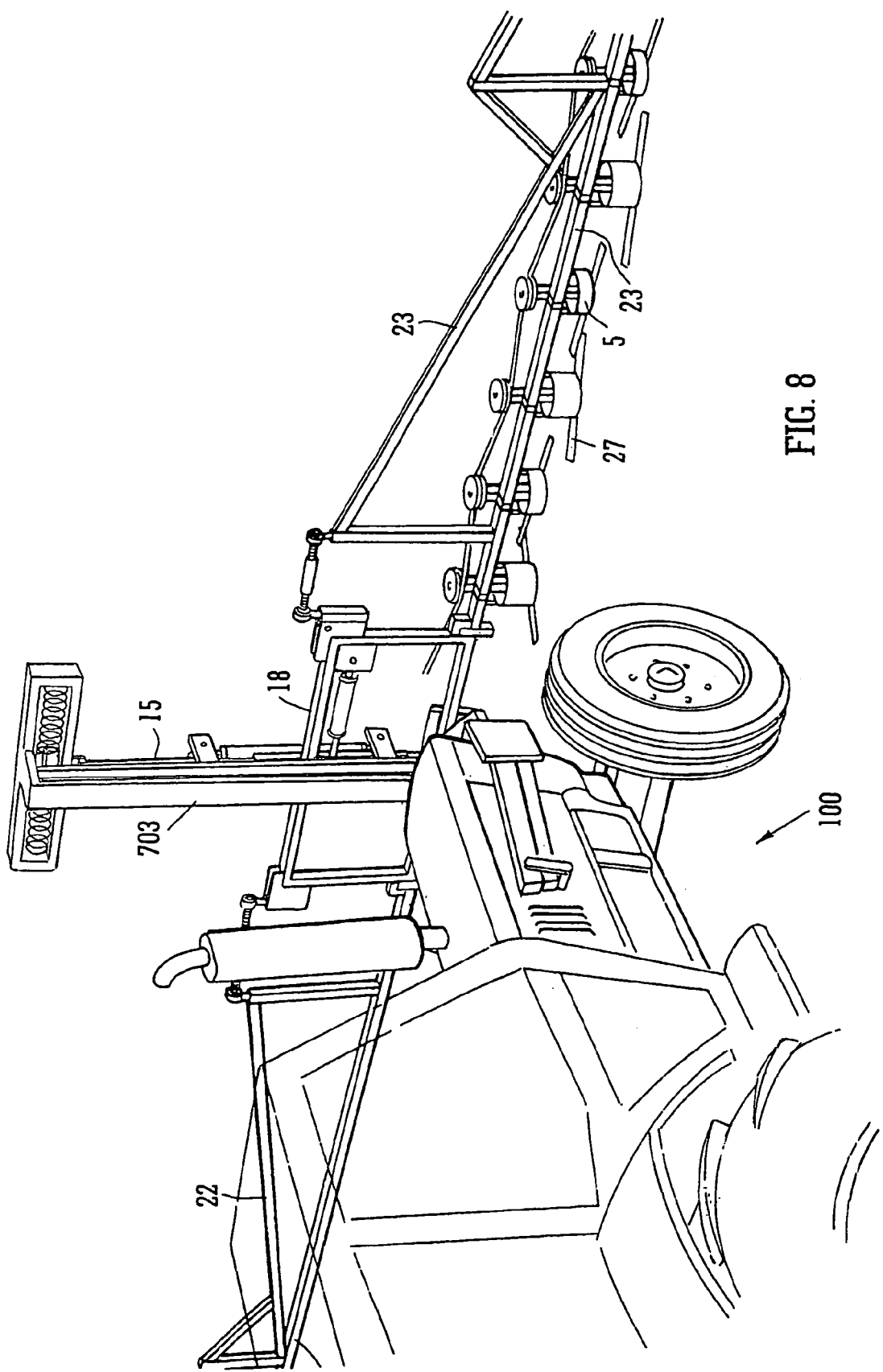
FIG. 8 is a perspective view of the embodiment of the FIG. 7 mounted on a tractor and in the operable position.

FIGS. 7 and 8 shows an alternative embodiment of the apparatus of the present invention and the same reference numerals are used for similar components. In this embodiment the dual vertical support struts previously described have been replaced with a single vertical strut 703. This strut is pivotable at the bottom portion thereof and can be tilted by a ram 703A. This allows for a maintenance of the support strut in an orientation parallel with the pendulum such as for example during movement on the side of a hill.

The single strut 703 is adapted to support a horizontally displaced curved bar 709 which provides for a smoother running of a wheel or roller when the tractor is passing over a bump.

The shock absorber or damper that was previously incorporated is now provided by means of a ram 713. This functions in much the same manner as the ram 13 previously described but in addition to maintaining the boom at the correct height also includes an accumulator so as to cushion the boom over rough terrain.

A portion of the pendulum 11 is carried using a roller or wheel 707, which is desirably adapted to run over and back on the curved bar 709. This wheel 707 is centred by springs 710 which are provided on either side thereof. It will be appreciated that when the tractor is travelling over level ground the wheel or roller is at the highest of the curve or arch which is in the middle of the curved bar whereas when the tractor travels over bumpy ground the wheel is biased to its normal position by the action of the two springs on the roller.

In this embodiment the boom frame 18 is connected directly to the sleeve 12 at a connection location 719. A connecting ram 721 is adapted to couple the boom frame 18 directly to the mounting support at a connection location 714. This serves to also control the sidewards displacement of the boom relative to the frame.

A single spring or damper 761 is provided to control the movement of the pendulum arm 12 in a vertical direction.

FIGS. 9 to 18 illustrate a further embodiment of the agricultural apparatus of the present invention, which is similar in construction to that illustrated in FIG. 7. Again a single vertical strut 903 is utilised as opposed to the two vertical struts that were described in the embodiment of FIG. 1 to 6.

Figure 9:
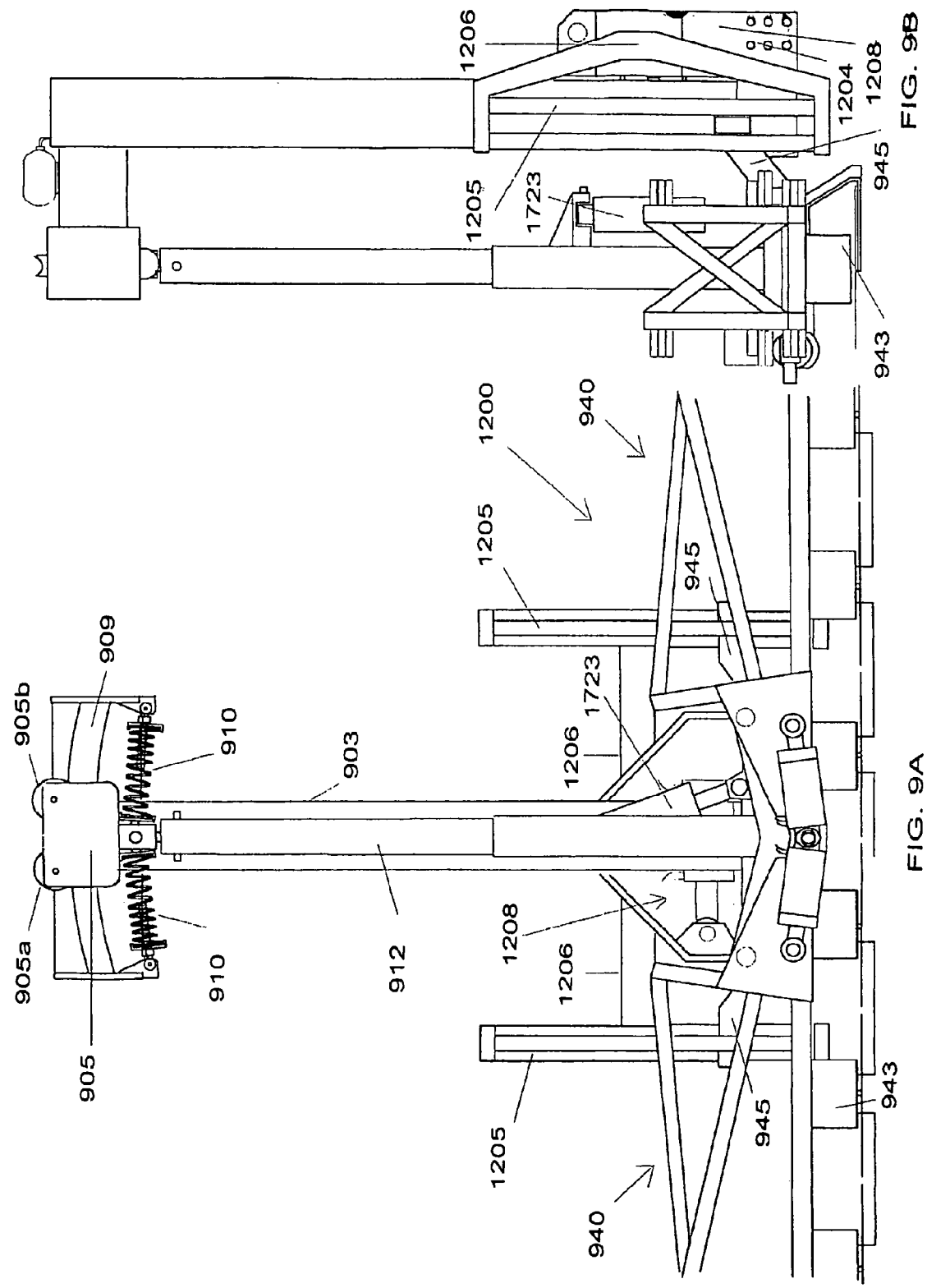
FIG. 9a is a front view of an agricultural apparatus according to a further embodiment of the present invention operating on level terrain.
FIG. 9b is a side view of the agricultural apparatus of FIG. 9a, FIG. 10 is a front view of the agricultural apparatus of FIG. 9 moving over a bump.
Figure 10:
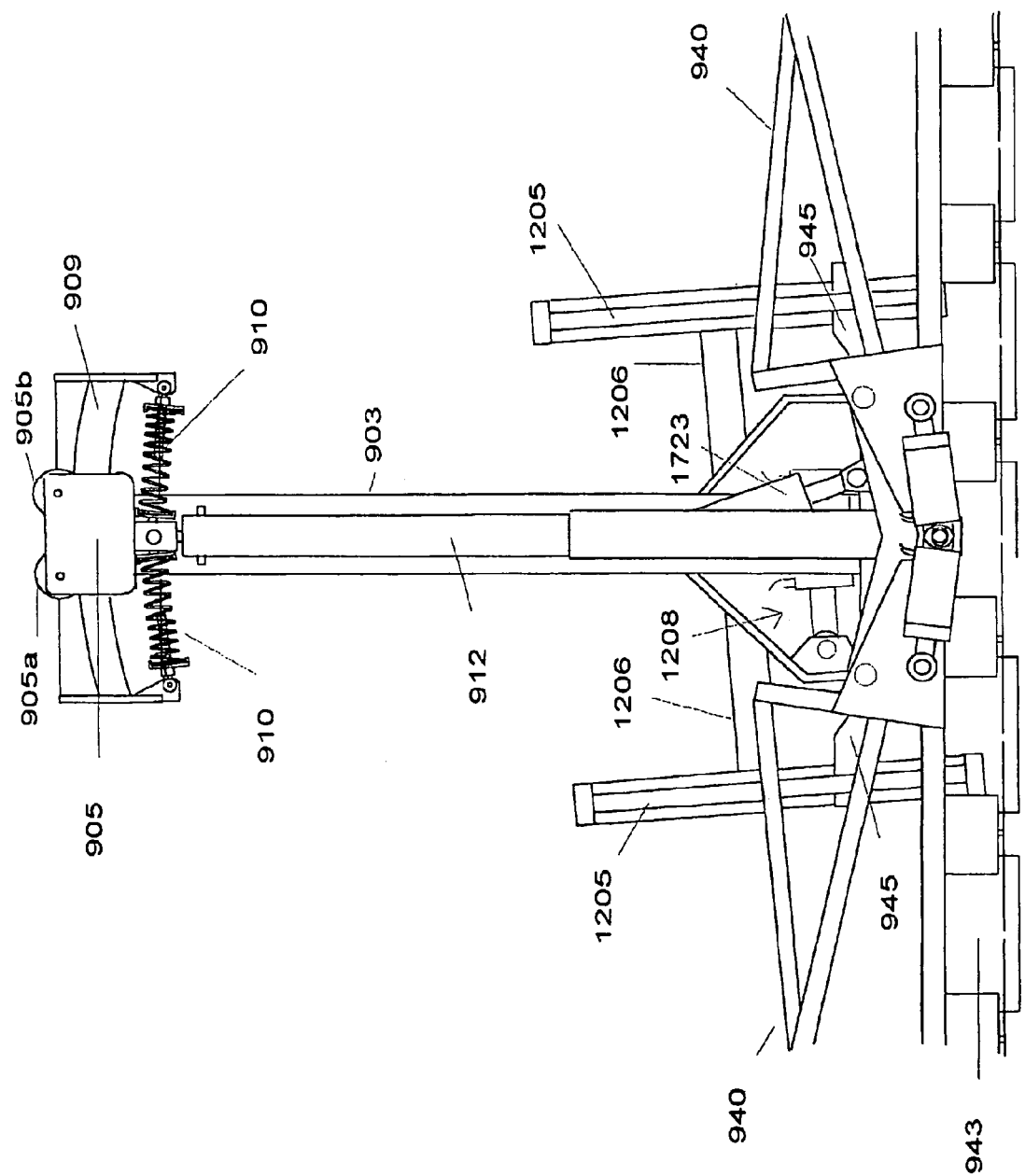
Figure 11:
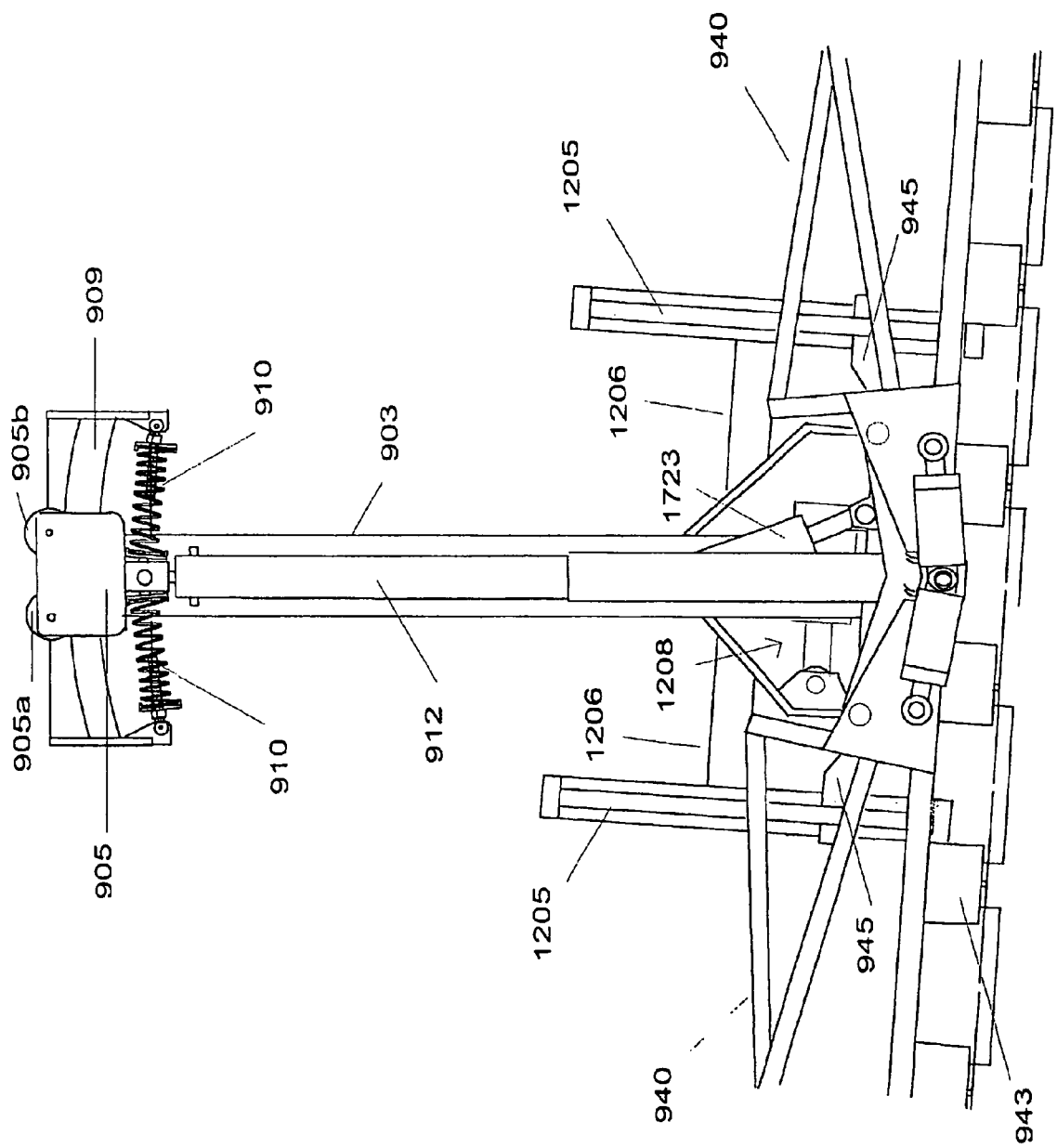
FIG. 11 is a front view of the agricultural apparatus of FIG. 9 working on a side of a hill.

The vertical strut 903 is connectable to the agricultural vehicle by means of a mounting frame (1200). The mounting frame is rigidly attachable to the agricultural machine but the vertical strut is pivotably connectable to the mounting frame. A pendulum (912) is also provided, the pendulum being pivotable relative to the vertical strut. The pendulum is adapted to support two boom arms (940), the boom arm being pivotable relative to the pendulum and extending either side of the pendulum. The boom arms are provided with restraining members (945) which are adapted to interengage with the mounting frame (1200) so as to prevent a movement of the boom in a direction away from the mounting frame. A plurality of cutting or spray heads (943) are provided on each arm (940). FIGS. 9, 10 and 11 illustrate how various components of the system may move relative to one another as the agricultural machine moves over varying terrain.

Figure 12C:
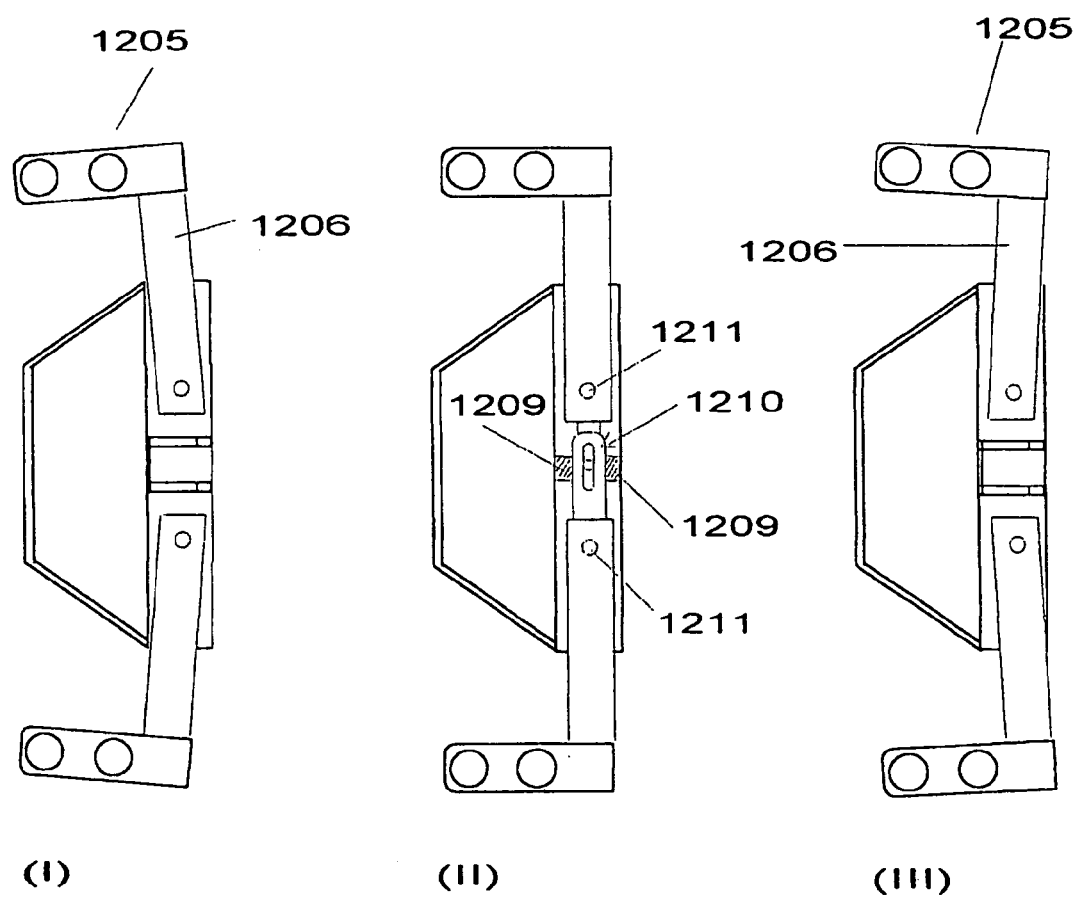
FIG. 12c(i) to (iii) are detailed front views of the operation of a torsion system of the present invention in three exemplary positions.

As shown in FIGS. 12a, 12b and 12c, the mounting frame 1200 is mountable on an agricultural tractor (not shown)by a three point linkage or any other means at a connection location (1204). The vertical strut is pivotablly connectable to the mounting frame at a pivot location (1207). The frame 1200 provides engagement members in the form desirably of two vertical roller mechanisms (1205), the roller bars being provided for maintaining the boom transverse to the intended direction of travel while maintaining a free movement of the boom regardless of gradient. The roller arms (1205) are adapted to interengage with the restraining members (945) provided on the boom. In operation this system allows both horizontal and vertical movement of the boom transverse to the tractor.

A torsion system (1206), shown in three positions in FIG. 12c allows the boom to be cushioned from abrupt acceleration or deceleration of the tractor including obviating any swivelling behaviour of the boom as the tractor turns. The torsion system (1206 FIG.12C) can be further complemented by the addition of a moving pivotable connect member allowing the left and right sections of the torsion system to interact in that any transverse movement of any side is mirrored, both sides of the torsion system are pivoted (1211) separately to the mounting frame, the moving pivotable connect member (1210) connecting both sides of the torsion system, cushioning & restriction of movement is achieved through the use of rubber blocks (1209) at adjacent sides of the moving pivotable connect member, these rubber blocks are ridgely fixed to the mounting frame, the rubber blocks can be replaced by springs or anything of a similar nature.

The torsion system can negate impending effects of( pushing, pulling) forces, where by a pushing force on one side of the boom would correspond in a change of position of (1206) with the direction of force experienced, this change of position would correspond to an equal movement of the restraining bars (1205) on the opposite side, thus pushing or pulling on any side of the boom alone would result in the opposite side moving in the same direction, this movement is cushioned and restricted in so far as to enable the obviation of swivelling while turning, without the boom experiencing sudden uncushioned forces through abrupt acceleration or deceleration of the tractor or through intermittent uneven cutting burden of the boom.

A transverse movement mechanism (1208) for enabling a transverse movement of this vertical strut (903) is also mounted on this mounting frame. Although not shown, the mounting frame may also be adapted to house any electrohydraulic system which controls the operation of the apparatus through manual or automatic selection or combination of both.

Figure 13A:
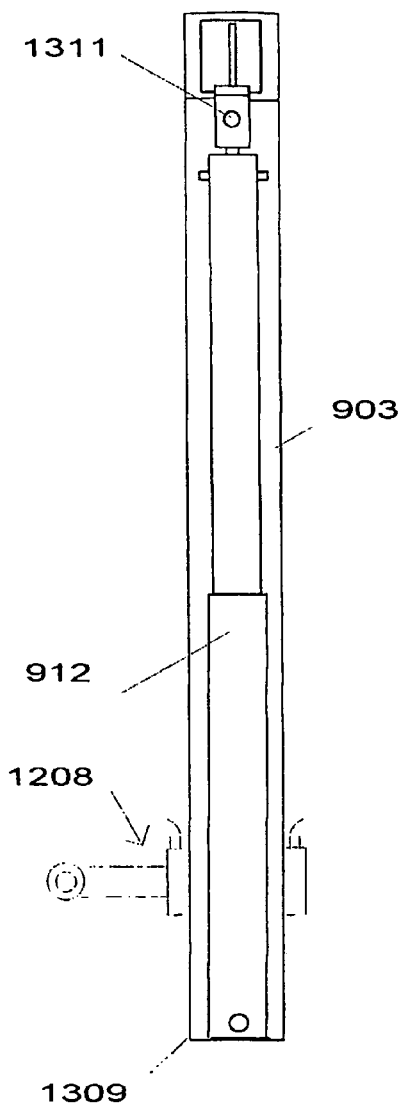
FIG. 13a is a front view of the pendulum and vertical strut portion of the apparatus.
Figure 13B:
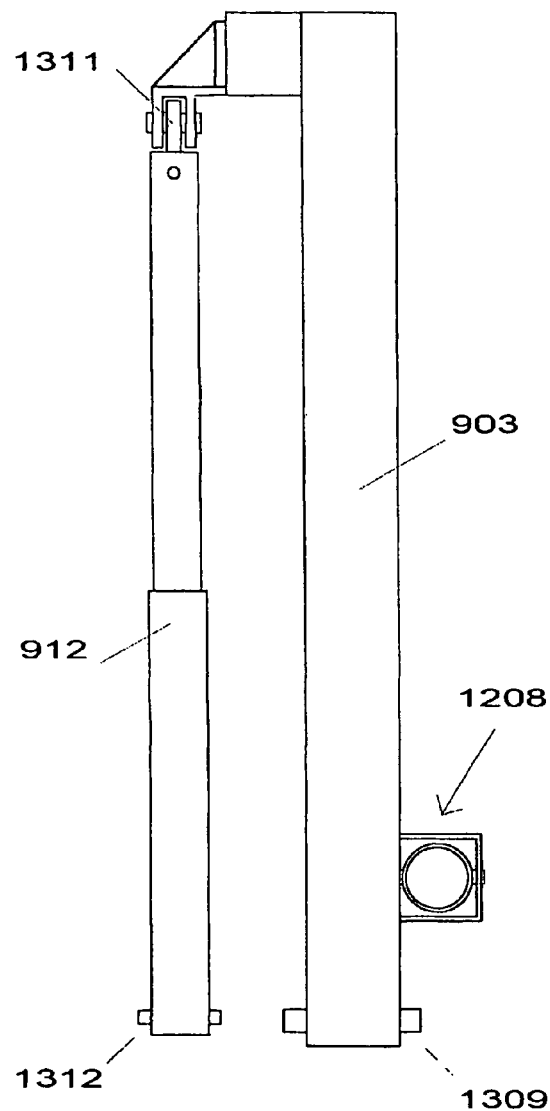
FIG. 13b is a side view of the portion illustrated in FIG. 13a, FIG. 14 is a front view of the centre couch end damper portion of the apparatus.
Figure 14:
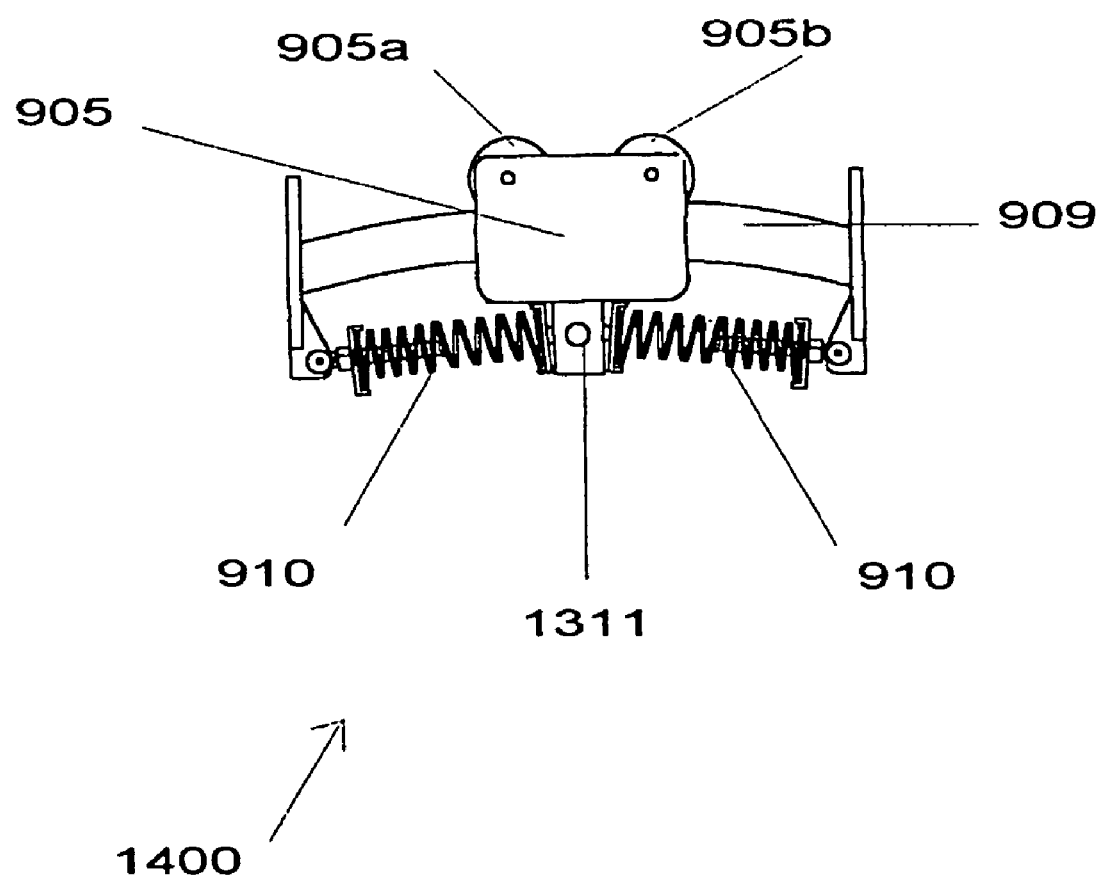

FIGS. 13a and 13b show in schematic form a dampening mechanism according to this embodiment of the present invention. The damper mechanism which dampens the effect of the transverse movement of the tractor, consists of two long struts which are pivotally connectable to one another at a pivot connection (1311). One part of this damper is a pendulum (912), it carries the boom which is pivotally connected, via a pivot connection (1312) at a bottom portion thereof. The pendulum (912) is suspended at the other end thereof from the pivot connection (1311). The support strut (903) is pivotally connected to the mounting frame by means of a connection block (1309) which is adapted to engage with the corresponding pivot engagement means (1207) shown previously in FIG. 12. The vertical support strut (903) is maintained in a vertical orientation by interfacing it with a mechanical and electronic or any other means (1208). This maintenance of the vertical position is maintained when the tractor goes over a bump or onto a side hill by this damper support strut moving against the transverse movement of the tractor. This keeps the vertical strut in line with the other side of the damper (the pendulum (912), that hangs vertical by gravity and is connected to the boom. Thus the boom will always remain stable at its pre set angle and height. Desirably the apparatus is provided with sensing means, the sensing means adapted to sense any movement of the pendulum relative to the vertical strut and to effect a movement of the vertical strut relative to the mounting frame to compensate for such movement.

Under certain circumstances the above dampening system (FIG. 14) can be further complemented by the addition of an arched, centre cushioned roller (1400) which can be fitted to the top of the above dampening system between the vertical strut (903) and the pendulum (912). This device dampens the effect of small but very fast transverse movements of the tractor that may not be taken up for one reason or another by the vertical strut damper either due to limitations of the control mechanism or travelling on very difficult ground.

The arched centre cushioned roller comprises of a roller mechanism (905), having two wheels or rollers (905a, 905b) that run on a curved bar (909) maintaining a central position through the use of two springs (910) mounted at adjacent sides of the curved bar. The roller mechanism carries the pendulum (912) at the pivot location (1311).

It will thus be appreciated that in this embodiment of the invention an apparatus is provided which is pivotable at three separate pivot locations: between the vertical strut and its mounting frame, the vertical strut and the pendulum, and the pendulum and the boom.

Figure 15:
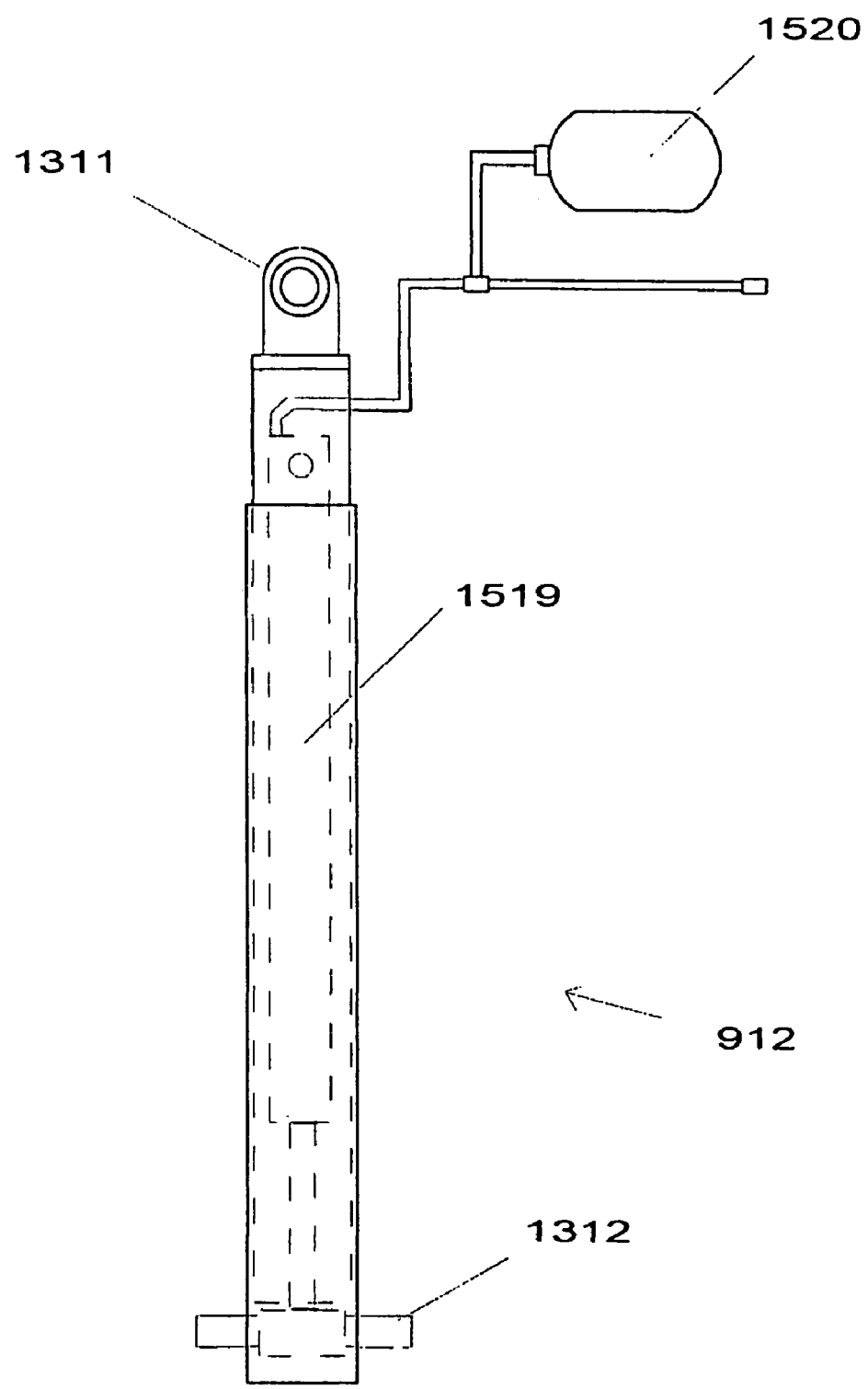
FIG. 15 is a detailed view of the pendulum.

Any vertical up and down movement of the boom relative to the frame as the tractor is travelling over bumpy ground is dampened in this present embodiment by a versatile telescopic pendulum (912), a schematic of which is illustrated in FIG. 15. Fitted into this telescopic pendulum (912) is a hydraulic ram (1519) which is connected to an accumulator or hydraulic dampening device (1520). This allows the ram to act as a damper. It can also be understood that this ram that acts as a damper can also controls the height adjustment of the boom.

Figure 16A:
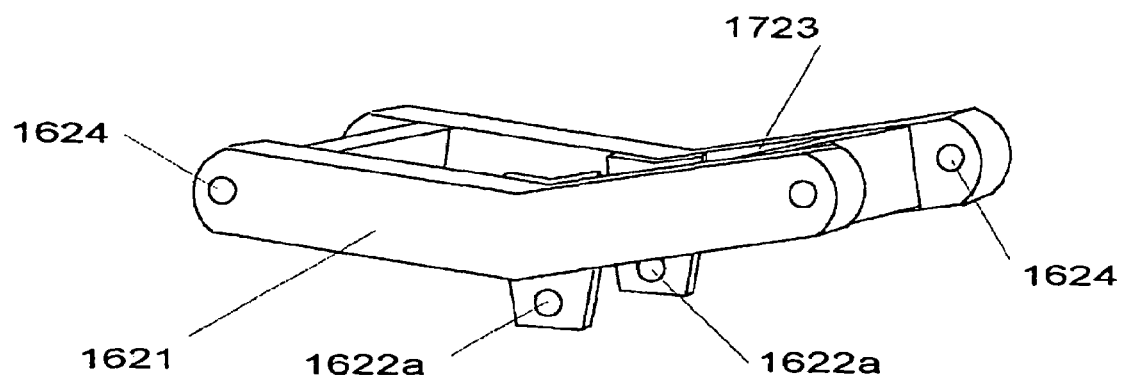
FIG. 16a is a detailed view of the carrier arm portion of the apparatus.
Figure 16B:
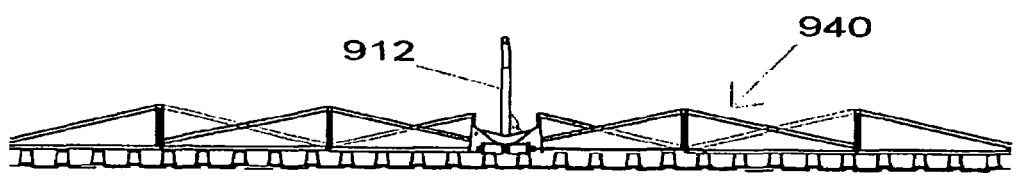
FIG. 16b is a perspective view of the boom carried on carrier arm of FIG. 16a, FIG. 17 is a front view of the apparatus showing the positioning of the boom arms in an intermediary position.

As shown in FIG. 16a the boom may be carried on a pivotally mounted v shaped carrier arm (1621). The carrier arm (1621) is pivotally connected to the bottom of the pendulum using the interengagement connectors (1622A) that are adapted to engage with the engagement members (1312) of the pendulum. FIG. 16b illustrates the v-shaped carrier arm (1621) carrying the boom.

Figure 17:
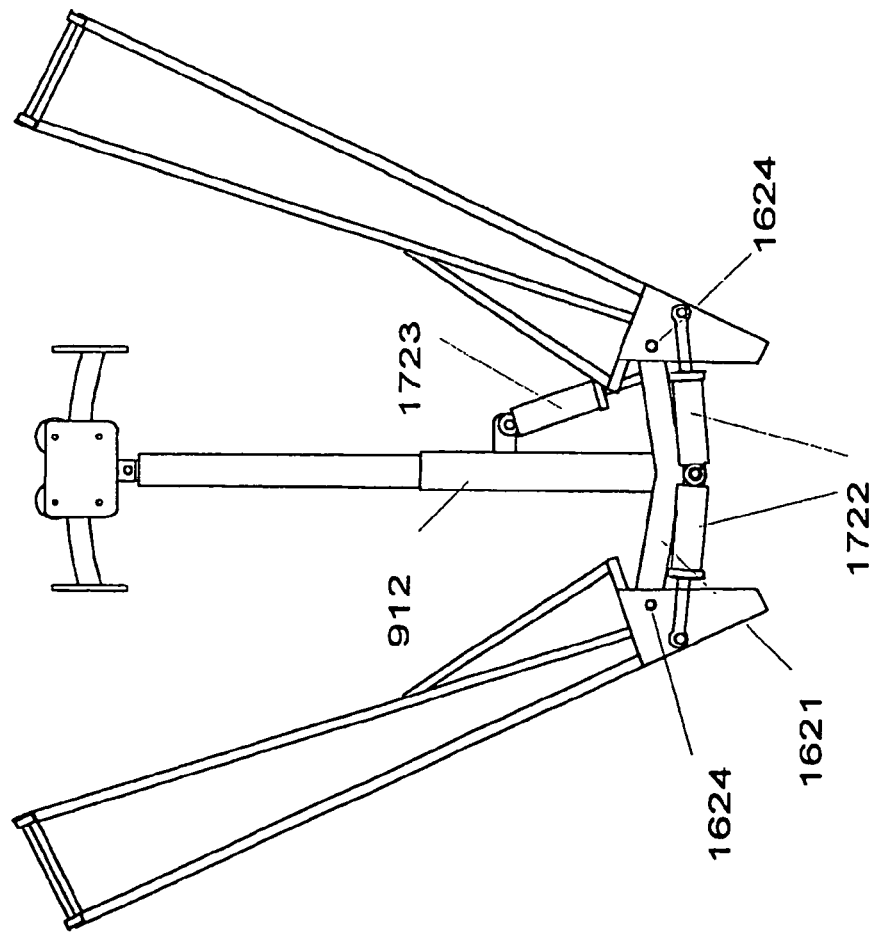

As shown in FIG. 17, the carrier arm may also be adapted to incorporate a hydraulic ram (1723) that is connectable between the carrier arm and the pendulum (912). This ram may be utilised to adjust the cutting angle of the boom. The carrier arm is provided with connection members (1624) at each end thereof so as to enable a pivotable connection of the boom to each end of the v shaped carrier arm. Attached at the bottom of the pendulum, two rams (1722) are used to connect to each side of the boom and when activated fold the boom upwards transverse to the tractor. The boom is desirably made up in sections with each section folding by swinging into the other. It will be appreciated that this can be modified such that a number of sections may be adapted to fold together as a swinging around would tend to cause a twisting stress on the boom when folding.

As shown in this embodiment a pendulum arm 912 is pivotablly mountable to a moveable support arrangement 905. Similarly to that described in earlier embodiments, the pendulum arm is effectively suspended from a curved arm 909. The curved arm 909 is mountable to a vertical strut 903 which is pivotably connectable to the mounting frame. In a normal mode of operation, when the agricultural machine is moving over flat ground the pendulum arm is centred on the curved arm and hangs directly down therefrom. As the agricultural machine moves over a slope or similar rough terrain the pendulum arm attempts to move along the curved arm so as to compensate for the slope in the terrain and maintain the pendulum arm in a vertical orientation relative to the ground over which it is moving. Such movement of the pendulum arm is effected by the incorporation of support wheels 905a, 905b, which are incorporated within the support arrangement and are moveable along an upper surface of the curved arm 909. Two dampening springs 910 are connectable to the pendulum arm and are adapted to minimise the extent of movement, maintaining the pendulum arm in a central orientation relative to the curved arm 909. As the pendulum arm attempts to move, a compensating movement of the vertical strut is effected so as to minimise any movement of the components relative to one another, yet maintaining the boom arms in the correct orientation to effect correct cutting or spraying.

Figure 18:
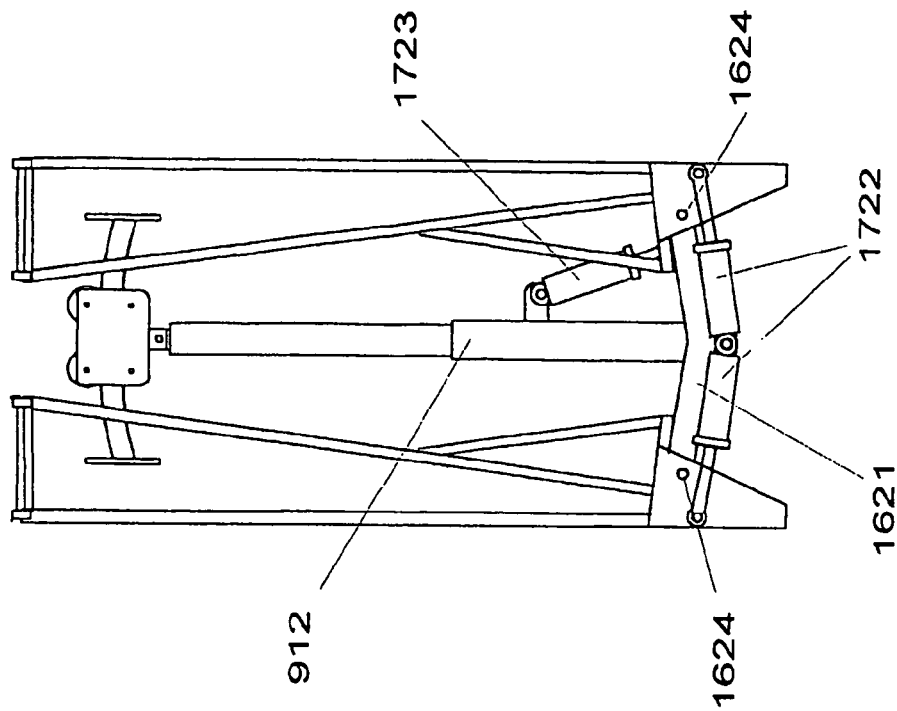
FIG. 18 is a front view of the apparatus showing the positioning of the boom arms in an upright non-operable position.
Figure 19:
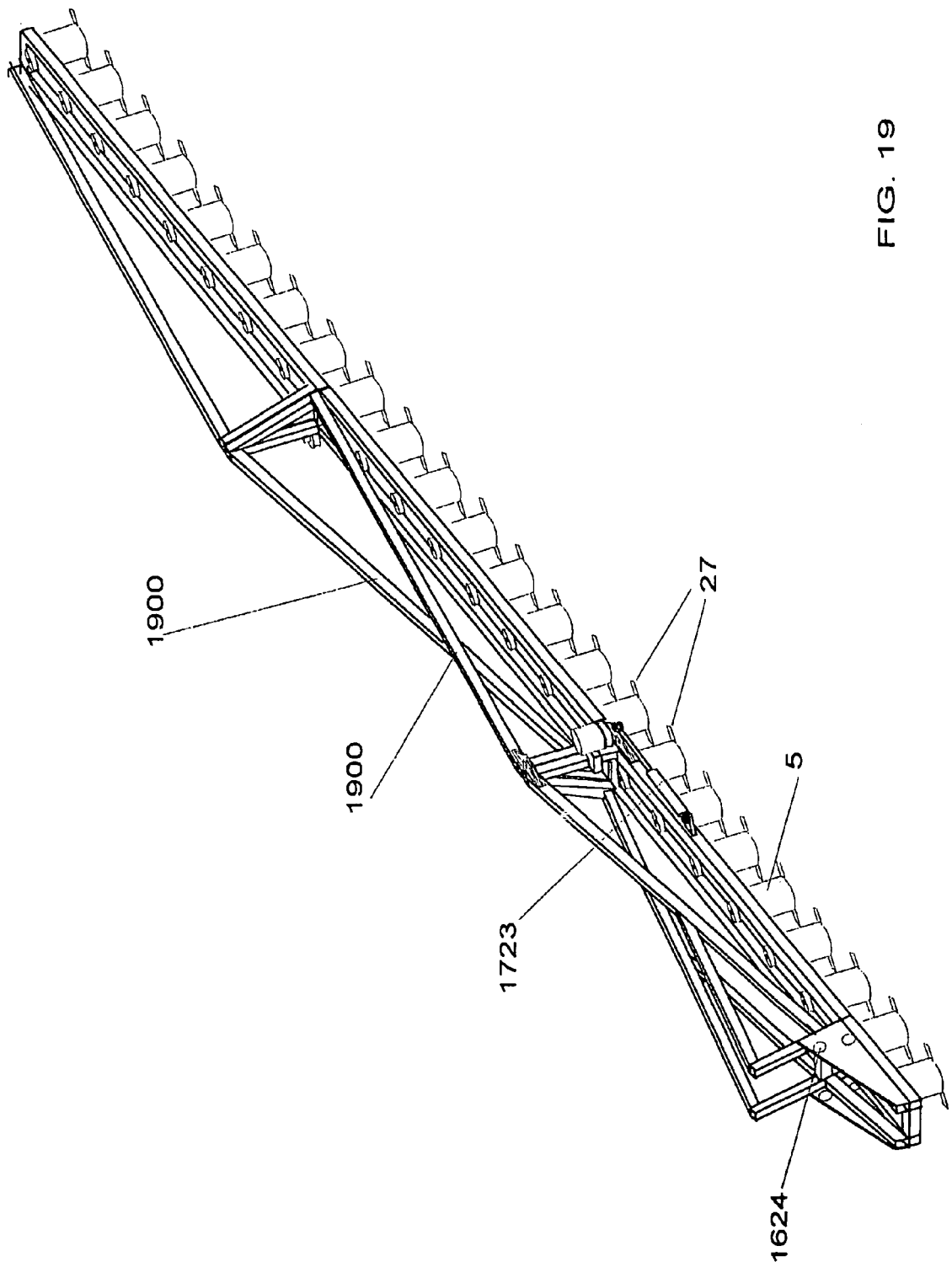
FIG. 19 is a perspective view of the boom of FIGS. 17 and 18 in an extended position.

FIG. 19 is a perspective view of the boom of FIGS. 17 and 18 in an extended position. It will be appreciated that the overlapping arrangement of support arms 1900 for the boom enables a distribution of weight along the length of the boom, thereby obviating any possibility of twisting or warping of the boom during operation.

It will be appreciated by those skilled in the art that although described with reference to a single rigid frame and a boom mounted thereon that alternative means of providing the height adjustable and transverse movement of the cutting devices relative to the tractor may be equally applicable. The words "comprises/comprising", "horizontal/vertical" and the words "having/including" when used herein with reference to the present invention are used to specify the presence of stated features, integers, steps or components but does not preclude the presence or addition of one or more other features, integers, steps, components or groups thereof.

The invention claimed is:

1. An agricultural apparatus adapted to be mounted to an agricultural vehicle, the apparatus comprising:
    a) a mounting frame mountable on the agricultural vehicle,
    b) a height adjustable boom pivotably mountable on the mounting frame and provided with a series of heads for cutting or spraying discrete areas of vegetation over which the boom is passed, the height of the boom relative to the mounting frame being adjustable so as to allow the height at which the vegetation is cut or sprayed to be adjusted, the boom being pivotable to enable the boom to move in a direction transverse to the intended direction of travel, and
    c) a damper provided between the boom and the frame to dampen movement of the boom relative to the frame, the damper comprising a pendulum which is pivotable relative to the boom, and wherein the pendulum is pivotally mounted to the frame, wherein the damper further comprises a vertical support pivotably mounted to the mounting frame and pivotable relative to the pendulum and wherein the vertical support acts so as to maintain an orientation parallel to the pendulum, the mounting of the pendulum being such as to maintain an orientation substantially perpendicular to the vegetation over which the apparatus passes, and further wherein the mounting frame includes engagement members adapted to engage with restraining members provided on the boom, the interaction between the engagement members and the restraining members maintaining the boom in an orientation transverse to the intended direction of travel while allowing a free movement of the boom regardless of the gradient over which the agricultural vehicle travels.

2. The apparatus as claimed in claim 1 wherein the boom comprises two arms, each arm being moveable between at least two positions, a first operative position wherein the boom is substantially transverse to the vehicle and a second non-operative position wherein the boom arms are substantially parallel.

3. The apparatus as claimed in claim 1 wherein the boom additionally comprises a support member pivotably attachable to the pendulum, and additionally pivotably connectable at either end thereof to swinging support arms, the swinging support arms being pivotably connectable at their other end to a boom connection frame, the pivoting arrangement of the support arms relative to both the support member and the connection frame enabling a movement of The connection frame relative to the vertical support.

4. The apparatus as claimed in claim 1 wherein the pivotable mounting of the boom relative to the pendulum is provided by a carrier arm engageable with both the pendulum and the arms of the boom, a pivoting of the carrier arm relative to the pendulum enabling a change in orientation of the arms relative to the pendulum.

5. The apparatus as claimed in claim 4 wherein the carrier arm includes an actuating means disposed between the carrier arm end the pendulum.

6. The apparatus as claimed in claim 5 wherein the actuation means is desirably provided by a hydraulic arm actuation of which effects a movement of the earner arm relative to the pendulum.

7. The apparatus as claimed in claim 1 wherein the engagement members arc mountable on arms extending from either side of the mounting frame, the arms being pivotably mountable relative to the mounting frame and adapted to move relative to the mounting frame to compensate for any corresponding movement of the boom.

8. The apparatus as claimed in claim 7 wherein each of the arms are pivotably mountable to a moveable connect member provided on the mounting frame, the connect member thereby connecting both sides of the boom through the mounting frame such that movement on one side of the boom can result in movement of the other side of the boom.

9. The apparatus as claimed in claim 1 further including sensing means, the sensing means adapted to sense any movement of the pendulum relative to the vertical support and to effect a movement of the vertical support relative to the mounting frame to compensate for such movement.

10. The apparatus as claimed in claim 1 wherein the pendulum is mountable in an arched roller arrangement provided between the vertical support and the pendulum.

11. The apparatus as claimed in claim 10 wherein the arched roller arrangement comprises a roller mechanism having at least two rollers which are adapted to be moveable along a support bar, the pendulum being suspendable from the roller mechanism.

12. The apparatus as claimed in claim 11 wherein the roller arrangement further includes biasing means to maintain the roller mechanism In a central orientation relative to the support bar.

13. The apparatus as claimed claim 1 wherein the vertical pendulum is telescopic, the telescoping pendulum having a hydraulic ram fitted thereto, an actuation of the ram effecting a change in length of the pendulum.

14. The apparatus as claimed in claim 13 wherein the ram can be adapted to effect a cushioning extension or contraction of the pendulum so as to enable it to provide a dampening effect.

15. The apparatus as claimed in claim 1 wherein the boom is provided with a plurality of engagement means adapted to engage with individual cutting devices.

16. The apparatus as claimed in claim 15 wherein the cutting devices comprise a shaft unit adapted to co-operate with the engagement means provided on the boom, the shaft unit comprising a collar with a rotatable shaft mounted therein.

17. The apparatus as claimed in claim 16 wherein the collar is co-operable with the boom and the rotatable shaft is free to rotate within the collar, the rotatable shaft being provided with cutting elements at one end thereof, the cutting elements being remote from the boom.

18. The apparatus as claimed in claim 17 further comprising guard means, the guard means being provided between the boom and the cutting elements, the guard means adapted to prevent any vegetation coming into contact with the shaft.

19. The apparatus as claimed in claim 18 wherein the length of the cutting elements is adjustable.

20. The apparatus as claimed in claims 19 wherein the rotation of the cutting elements is effected by means of a belt mechanism, the belt mechanism being powered by a motor mountable to the boom.

21. The apparatus as claimed in claim 18 wherein adjacent cutting devices are provided with cutting elements of non-equal length.

22. The apparatus as claimed in claims 21 wherein the rotation of the cutting elements is effected by means of a belt mechanism, the belt mechanism being powered by a motor mountable to the boom.

23. The apparatus as claimed in claims 18 wherein the rotation of the cutting elements is effected by means of a belt mechanism, the belt mechanism being powered by a motor mountable to the boom.

24. The apparatus as claimed in claim 17 wherein the length of the cutting elements is adjustable.

25. The apparatus as claimed in claim 24 wherein adjacent cutting devices are provided with cutting elements of non-equal length.

26. The apparatus as claimed in claims 25 wherein the rotation of the cutting elements is effected by means of a belt mechanism, the belt mechanism being powered by a motor mountable to the boom.

27. The apparatus as claimed in claims 24 wherein the rotation of the cutting elements is effected by means of a belt mechanism, the belt mechanism being powered by a motor mountable to the boom.

28. The apparatus as claimed in claim 17 wherein adjacent cutting devices are provided with cutting elements of non-equal length.

29. The apparatus as claimed in claims 28 wherein the rotation of the cutting elements is effected by means of a belt mechanism, the belt mechanism being powered by a motor mountable to the boom.

30. The apparatus as claimed in claims 17 wherein the rotation of the cutting elements is effected by means of a belt mechanism, the belt mechanism being powered by a motor mountable to the boom.

31. The apparatus as claimed in claims 16 wherein the rotation of the cutting elements is effected by means of a belt mechanism, the belt mechanism being powered by a motor mountable to the boom.

32. An agricultural apparatus adapted to be mounted to an agricultural vehicle apparatus comprising:
   a) a mounting frame mountable on the agricultural vehicle,
   b) a height adjustable boom comprising two arms wherein each arm is provided in a plurality of engageable sections, at least one of the sections being foldable onto another, and when in an extended position the multiple sections are supported by interleaving support members extending along the axis of the arm, said arms being pivotably mounted on the mounting frame and provided with a series of heads for cutting or spraying discrete areas of vegetation over which the boom is passed, the height of the boom relative to the mounting frame being adjustable so as to allow the height at which the vegetation is cut or sprayed to be adjusted, the boom being pivotable to enable the boom to move in a direction transverse to the intended direction of travel, wherein each arm of the boom is moveable between at least two positions, a first operative position wherein the boom is substantially transverse to the vehicle and a second non-operative position wherein the boom arms are substantially parallel, and
   c) a damper provided between the boom and the frame to dampen movement of the boom relative to the frame, said damper comprises a pendulum pivotally mounted to said frame and is supported on an arched roller arrangement, whereby said damper further comprises a vertical support pivotally mounted to the mounting frame and pivotable relative to the pendulum and wherein the vertical support acts so as to maintain an orientation parallel to the pendulum.
   the mounting of the pendulum being such as to maintain an orientation substantially perpendicular to the vegetation over which the apparatus passes.

33. An agricultural apparatus adapted to be mounted to an agricultural vehicle apparatus comprising:
   a) a mounting frame mountable on the agricultural vehicle,
   b) a height adjustable boom comprising two arms wherein each arm is provided in a plurality of engageable sections, at least one of the sections being foldable onto another, and when in an extended position the multiple sections are supported by interleaving support members extending along the axis of the arm, said arms being pivotably mounted on the mounting frame and provided with a series of heads for cutting or spraying discrete areas of vegetation over which the boom is passed, the height of the boom relative to the mounting frame being adjustable so as to allow the height at which the vegetation is cut or sprayed to be adjusted, the boom being pivotable to enable the boom to move in a direction transverse to the intended direction of travel, wherein each arm of the boom is moveable between at least two positions, a first operative position wherein the boom is substantially transverse to the vehicle and a second non-operative position wherein the boom arms are substantially parallel, and c) a damper provided between the boom and the frame to dampen movement of the boom relative to the frame, said damper comprises a pendulum pivotally mounted to said frame and is supported on an arched roller arrangement, pivotable mounting of the boom relative to the pendulum being provided by a carrier arm, wherein said carrier arm comprises an actuating means disposed between the carrier arm and the pendulum, the actuation of which effects a movement of said carrier arm relative to the pendulum, pivoting of said carrier arm relative to the pendulum enabling a change in orientation of the arms relative to the pendulum, wherein said damper further comprises a vertical support pivotably mounted to the mounting frame and pivotable relative to a pendulum and wherein the vertical support acts so as to maintain an orientation parallel to the pendulum, the mounting of the pendulum being such as to maintain an orientation substantially perpendicular to the vegetation over which the apparatus passes.

\* \* \* \* \*